United States Patent
Uhr et al.

(10) Patent No.: US 11,316,699 B2
(45) Date of Patent: Apr. 26, 2022

(54) METHOD FOR AUTHENTICATING USER CONTACTLESSLY BASED ON DECENTRALIZED IDENTIFIER USING VERIFIABLE CREDENTIAL AND AUTHENTICATION SUPPORTING SERVER USING THE SAME

(71) Applicant: Coinplug, Inc., Seongnam-si (KR)

(72) Inventors: Joon Sun Uhr, Seongnam-si (KR); Moon Gju Suh, Seoul (KR); Joo Han Song, Seongnam-si (KR)

(73) Assignee: Coinplug, Inc., Seonenam-si (KR)

( * ) Notice: Subject to any disclaimer, the term of this patent is extended or adjusted under 35 U.S.C. 154(b) by 0 days.

(21) Appl. No.: 17/383,505

(22) Filed: Jul. 23, 2021

(65) Prior Publication Data

US 2022/0029825 A1 Jan. 27, 2022

(30) Foreign Application Priority Data

Jul. 24, 2020 (KR) .................. 10-2020-0092632
Jul. 20, 2021 (KR) .................. 10-2021-0095189

(51) Int. Cl.
*H04L 9/32* (2006.01)
*H04L 9/08* (2006.01)

(52) U.S. Cl.
CPC .......... *H04L 9/3247* (2013.01); *H04L 9/0825* (2013.01); *H04L 9/3231* (2013.01); *H04L 9/3263* (2013.01); *H04L 2209/38* (2013.01)

(58) Field of Classification Search
CPC ... H04L 9/3247; H04L 9/0825; H04L 9/3231; H04L 9/3263; H04L 2209/38
See application file for complete search history.

(56) References Cited

U.S. PATENT DOCUMENTS 11,063,770 B1 * 7/2021 Peng ............... H04L 63/123
2019/0319940 A1 * 10/2019 Hamel .............. H04L 9/3271
(Continued)

FOREIGN PATENT DOCUMENTS

KR 10-2021-0029702 * 3/2021 ............. G06Q 20/36

OTHER PUBLICATIONS

Alzahrani, "An Information-Centric Networking Based Registry for Decentralized Identifiers and Verifiable Credentials", Aug. 4, 2020, IEEE Access, vol. 8, p. 1-11.*

*Primary Examiner* — Christopher A Revak
(74) *Attorney, Agent, or Firm* — Husch Blackwell LLP

(57) ABSTRACT

A method for authenticating users contactlessly with decentralized identifiers (DID) using verifiable credentials is provided. The method includes steps of: an authentication supporting server, (a) on condition that a user DID is issued and a user public key is registered in a blockchain network, in response to a contactless authentication request, (i) retrieving the user public key from the blockchain network or from a user DID document sent by a resolving server and (ii) verifying a user signature value; and (b) (i) transmitting real-time feature point information and identity confirmation information to a certification authority (CA) server, (ii) allowing the CA server to transmit authentication result information, (iii) retrieving a CA server public key from the blockchain network or from a CA server DID document sent by the resolving server, (iv) verifying a CA server signature value, (v) registering the authentication result information, and (vi) transmitting a user verifiable credential.

18 Claims, 18 Drawing Sheets

(56) References Cited

U.S. PATENT DOCUMENTS

| | | | |
|---|---|---|---|
| 2020/0026834 A1* | 1/2020 | Vimadalal | G06F 16/182 |
| 2020/0153606 A1* | 5/2020 | Li | H04L 9/30 |
| 2020/0327775 A1* | 10/2020 | Larimer | G07F 17/3255 |
| 2021/0194703 A1* | 6/2021 | Queralt | H04W 12/069 |
| 2021/0279989 A1* | 9/2021 | O'Sullivan | G07C 9/27 |
| 2021/0281421 A1* | 9/2021 | Semenovskiy | H04L 9/3247 |

* cited by examiner

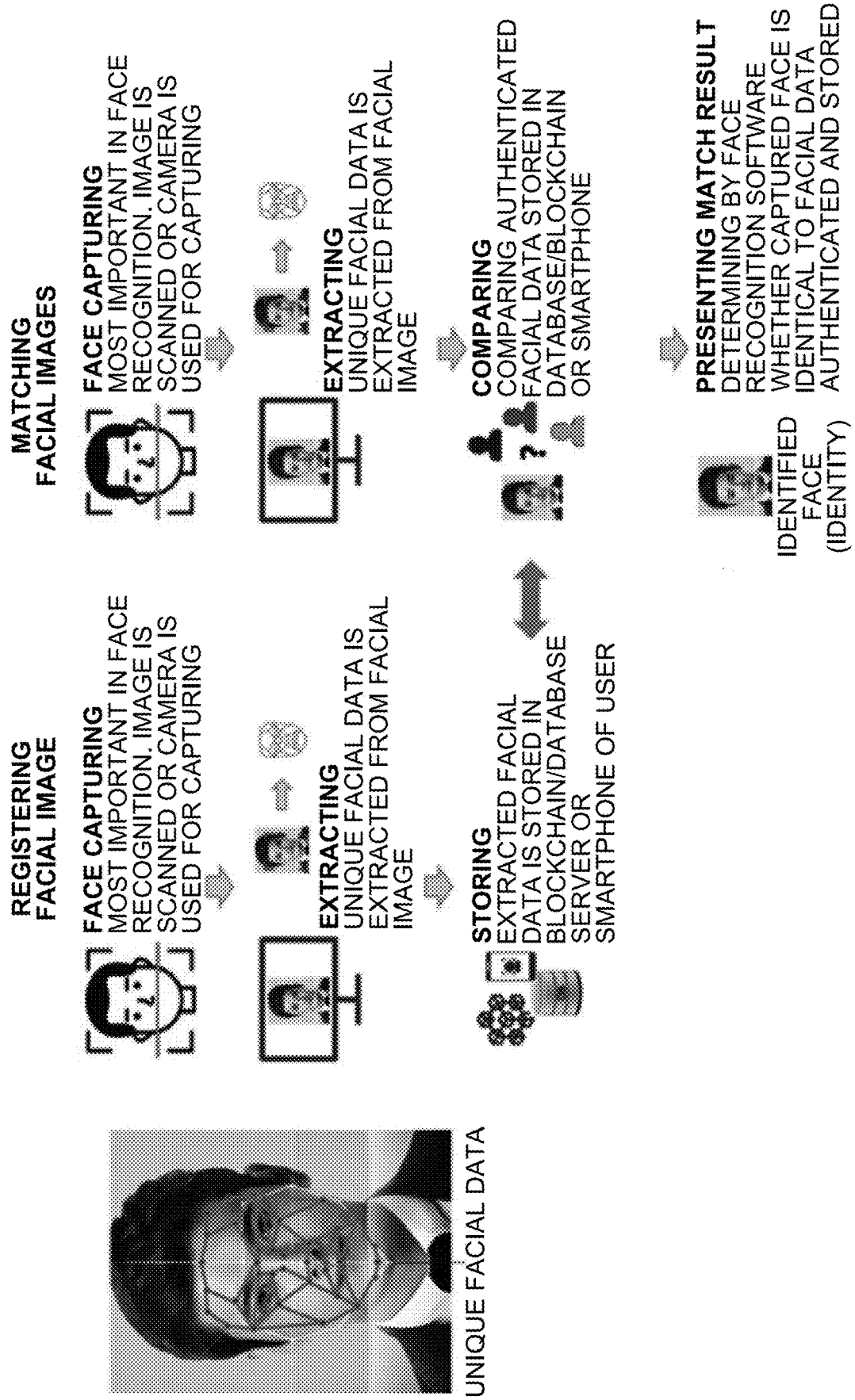

FIG. 6B
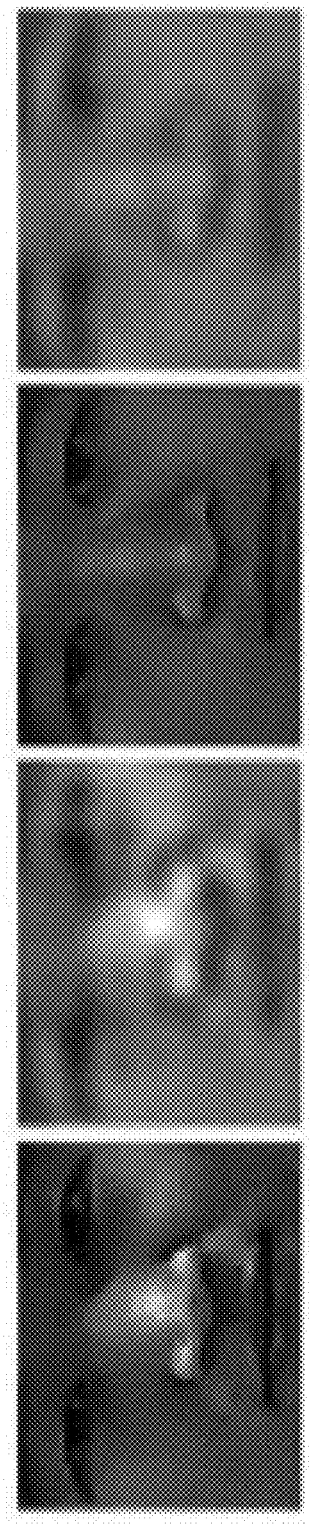
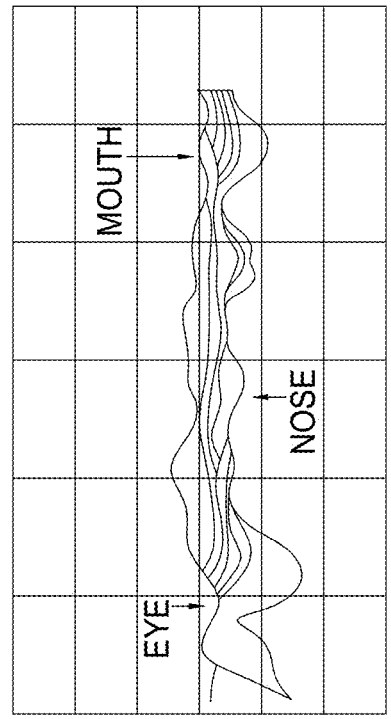
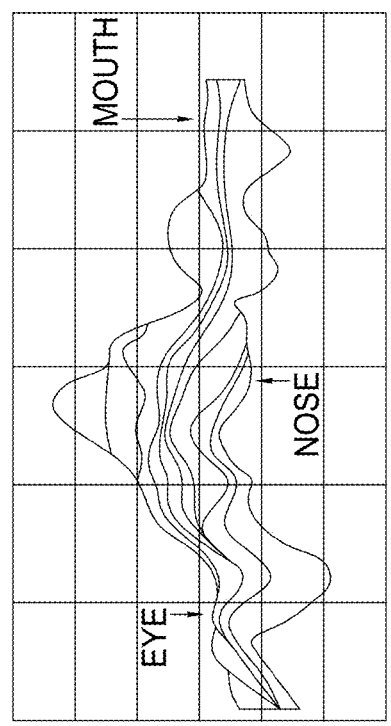

FIG. 6E
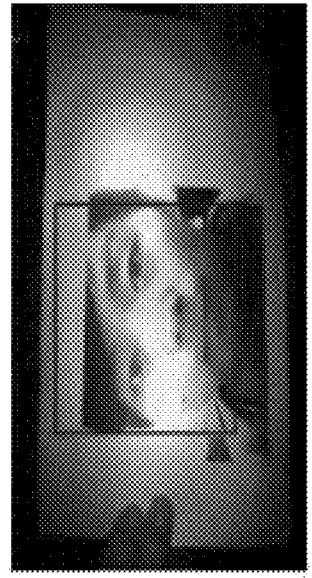
(B) PHOTO FACE INPUT IMAGE
(D) PHOTO FACE ROI IMAGE
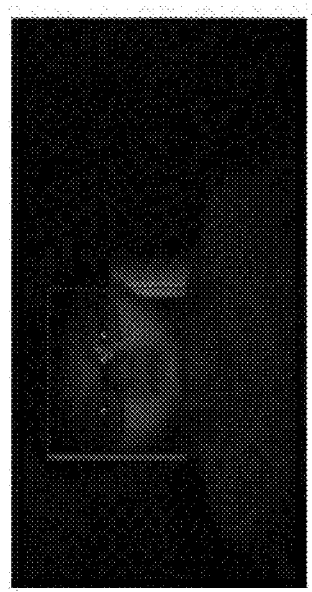
(A) REAL FACE INPUT IMAGE
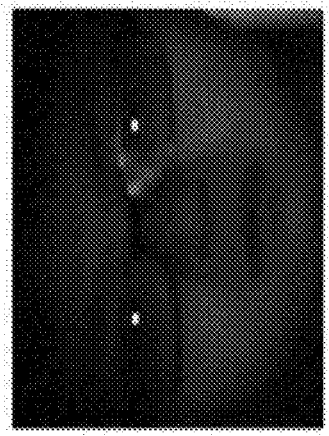
(C) REAL FACE ROI IMAGE

METHOD FOR AUTHENTICATING USER CONTACTLESSLY BASED ON DECENTRALIZED IDENTIFIER USING VERIFIABLE CREDENTIAL AND AUTHENTICATION SUPPORTING SERVER USING THE SAME

CROSS REFERENCE TO RELATED APPLICATION

This application claims the benefit of priority to Korean Provisional Patent Application No. 10-2020-0092632 filed on Jul. 24, 2020, and Korean Non-Provisional Patent Application No. 10-2021-0095189 filed on Jul. 20, 2021, the entire contents of which being incorporated herein by reference.

FIELD OF THE DISCLOSURE

The present disclosure relates to a method for authenticating a user contactlessly based on decentralized identifiers (DID) using a verifiable credential and an authentication supporting server using the same, and more particularly, to the method for authenticating the user contactlessly by using contactless authentication information and user signature authentication based on the DID and the authentication supporting server using the same.

BACKGROUND OF THE DISCLOSURE

The mainstream of conventional security technology for personal authentication includes a key-in method of using what a user remembers, or a contact-type method of using biometric authentication such as fingerprints, finger veins, and palm veins.

However, the technology as such can cause unnecessary indirect contact with users, which can lead to poor hygiene including disease infection, and since the technology requires the users to go through complex procedures resulting in discomfort if the users lack understanding of the technology, such inconvenience remains a problem in popularizing the technology.

In Korea, in order to solve this problem, a contactless authentication method, i.e., authentication without meeting face-to-face, has recently been adopted, and thus, for example, it is possible to open an account through the contactless authentication without having to go to a bank. This is made possible by a decision from the Financial Services Commission as part of financial reformation to prevent new financial services from being unable to be provided due to legal restrictions, and thus Real Name Financial Act and Electronic Financial Transactions Act allow the contactless authentication.

In the contactless authentication as such, when the contactless authentication is required for financial transactions, etc., the service could be provided only by following the guidelines given by the Financial Security Institute and passing the security screening process.

As examples of general contactless authentication, mandatory processes include submission of a copy of identity information, video call, confirmation when means of access is delivered, use of existing accounts, and other equivalent methods, and further, optional processes include verification of multiple pieces of personal information and use of verification results from other institutions.

However, in the conventional centralized identification technology, the sovereignty of personal information (including biometric information) is not guaranteed, and there are problems such as leakage of the personal information.

In addition, since it is possible to copy and steal the conventional public certificates, it is recognized as an authentication method insufficient for the contactless service.

Therefore, there may be a need for a simple and safe authentication method for the contactless service and a verified technology for digital signatures for use thereof.

SUMMARY OF THE DISCLOSURE

It is an object of the present disclosure to solve all the aforementioned problems.

It is another object of the present disclosure to enable non-face-to-face/contactless identity authentication using biometric technology that identifies each user with biometric information.

It is still another object of the present disclosure to provide self-regulating distributed digital identity information management technology in order to allow a user to manage/supervise the identity information by oneself and to select a scope and a part of the identity information to be opened to public by authentication and digital signatures through blockchain-based decentralized identifiers.

In order to accomplish objects above and characteristic effects to be described later of the present disclosure, distinctive structures of the present disclosure are described as follows.

In accordance with one aspect of the present disclosure, there is provided a method for authenticating a user contactlessly based on decentralized identifiers (DID) using a verifiable credential (VC), including steps of: (a) on condition that a user DID has been issued through a blockchain network and that a user public key corresponding to the user DID has been registered in the blockchain network, in response to acquiring a contactless authentication request, from a user device, including (1) the user DID, (2) identity confirmation information, (3) first real-time user biometric information, and (4) a user signature value created by signing the first real-time user biometric information with a user private key corresponding to the user public key, an authentication supporting server performing or supporting another device to perform (i) one of (i-1) a process of retrieving the user public key from the blockchain network by referring to the user DID and (i-2) (i-2a) a process of allowing a resolving server to retrieve information, corresponding to the user DID, including the user public key registered in the blockchain network by referring to the user DID and thus to generate a user DID document and to transmit the user DID document to the authentication supporting server and (i-2b) a process of retrieving the user public key from the user DID document and (ii) a process of verifying the user signature value by using the user public key; and (b) in response to verifying the user signature value, the authentication supporting server performing or supporting another device to perform (i) a process of transmitting real-time feature point information extracted from the first real-time user biometric information and the identity confirmation information to a certification authority (CA) server, to thereby allow the CA server to authenticate the identity confirmation information, (ii) a process of allowing the CA server to transmit authentication result information, including (1) a CA server DID, (2) first modified information created by modifying the real-time feature point information, and (3) a CA server signature value created by signing the first modified information with a CA server private key, to the authentication supporting server, according to an authentication result of the identity confirmation information, (iii) in response to acquiring the authentication result information, one of (iii-1) a process of retrieving a CA server public key from the blockchain network by referring to the CA server DID and (iii-2) (iii-2a) a process of allowing the resolving server to retrieve information, corresponding to the CA server DID, including the CA server public key registered in the blockchain network by referring to the CA server DID and thus to generate a CA server DID document and to transmit the CA server DID document to the authentication supporting server and (iii-2b) a process of retrieving the CA server public key from the CA server DID document, (iv) a process of verifying the CA server signature value by using the CA server public key, (v) in response to verifying the CA server signature value, a process of registering the authentication result information in the blockchain network, and (vi) a process of transmitting a user verifiable credential about the authentication result information registered in the blockchain network to the user device.

As one example, the identity confirmation information is certificate identity information of the user, and wherein, at the step of (a), the authentication supporting server performs or supports another device to perform (i) a process of determining whether the first real-time user biometric information is forged and (ii) in response to determining that the first real-time user biometric information is not forged, a process of determining whether the first real-time user biometric information corresponds to certificate user biometric information by referring to (1) certificate identity feature point information extracted from the certificate user biometric information included in the certificate identity information and (2) the real-time feature point information, to thereby confirm whether the first real-time user biometric information is valid.

As one example, the user device creates the first real-time user biometric information by capturing a face of the user and wherein the first real-time user biometric information includes spatial information on the face of the user detected by a ToF (Time of Flight) module of the user device and wherein, at the step of (a), the authentication supporting server performs or supports another device to perform a process of determining whether the first real-time user biometric information is forged by referring to the spatial information representing distance information from the user device to each of points on the face of the user.

As one example, the certificate user biometric information is facial image information on the user which is included in the certificate identity information and wherein the first real-time user biometric information is real-time image information created by capturing a face of the user in response to a request for the first real-time user biometric information from the authentication supporting server.

As one example, at the step of (a), the authentication supporting server performs or supports another device to perform (i) a process of inputting (1) the facial image information included in the certificate identity information and (2) the real-time image information into a convolutional layer, to thereby allow the convolutional layer to apply at least one convolution operation to each of the facial image information and the real-time image information and thus to output a facial feature map and a real-time feature map respectively corresponding to the facial image information and the real-time image information, (ii) a process of inputting the facial feature map and the real-time feature map into an RPN, to thereby allow the RPN to output proposal boxes, corresponding to a facial area of the user, on the facial feature map and the real-time feature map, (iii) a process of inputting the proposal boxes into a pooling layer, to thereby allow the pooling layer to apply at least one pooling operation to regions, respectively corresponding to the proposal boxes, on the facial feature map and the real-time feature map and thus to (iii-1) generate pooled feature maps and to (iii-2) output a facial feature vector and a real-time feature vector respectively corresponding to the pooled feature maps, (iv) a process of inputting the facial feature vector and the real-time feature vector into an FC layer, to thereby allow the FC layer to output a first score and a second score respectively corresponding to the facial feature vector and the real-time feature vector, and (v) a process of confirming whether the first real-time user biometric information is valid by referring to the first score and the second score.

As one example, the identity confirmation information is certificate identity information of the user, and wherein, at the step of (b), the authentication supporting server performs or supports another device to perform a process of allowing the CA server to (i) extract certificate identity feature point information from the certificate identity information, (ii) extract identity registry feature point information from identity registry information corresponding to the certificate identity information, and (iii) determine whether the certificate identity information corresponds to the identity registry information by referring to the certificate identity feature point information and the identity registry feature point information, to thereby authenticate the certificate identity information.

As one example, the method further includes a step of: (c) on condition that (c1) a service request is transmitted from the user device to a service providing server, (c2) a contactless authentication request for the first real-time user biometric information is transmitted from the service providing server to the user device wherein the first real-time user biometric information is used for providing a service of the service providing server to the user device, (c3) the user DID and the user verifiable credential about the first real-time user biometric information is transmitted from the user device to the service providing server, and (c4) an authentication request for the user verifiable credential is acquired from the service providing server wherein the authentication request includes (1) the user DID, (2) the user verifiable credential, and (3) a VC user signature value created by signing the user verifiable credential with the user private key, the authentication supporting server performing or supporting another device to perform (i) one of (i-1) a process of retrieving the user public key from the blockchain network by referring to the user DID and (i-2) (i-2a) a process of allowing the resolving server to retrieve the information, corresponding to the user DID, including the user public key registered in the blockchain network by referring to the user DID and thus to generate the user DID document and to transmit the user DID document to the authentication supporting server and (i-2b) a process of retrieving the user public key from the user DID document, (ii) a process of verifying the VC user signature value by using the user public key, (iii) in response to acquiring the user verifiable credential as a result of verifying the VC user signature value, one of (iii-1) a process of retrieving the CA server public key from the blockchain network by referring to the CA server DID included in the user verifiable credential and (iii-2) (iii-2a) a process of allowing the resolving server to retrieve the information, corresponding to the CA server DID, including the CA server public key registered in the blockchain network by referring to the CA server DID and thus to generate the CA server DID document and to transmit the CA server DID document to the authentication supporting server and (iii-2b) a process of retrieving the CA server public key from the CA server DID document, (iv) a process of verifying the CA server signature value included in the user verifiable credential by using the CA server public key, (v) in response to acquiring the first modified information as a result of verifying the CA server signature value, a process of transmitting a request for authentication information to the user device, (vi) in response to acquiring second real-time user biometric information as the authentication information from the user device, a process of determining whether the second real-time user biometric information is valid by referring to (1) second modified information created by modifying new feature point information extracted from the second real-time user biometric information and (2) the first modified information, and (vii) in response to confirming that the second real-time user biometric information is valid, a process of transmitting a contactless authentication result, corresponding to the contactless authentication request, to the service providing server.

As one example, the first modified information is created by applying hash operation to the real-time feature point information extracted from the first real-time user biometric information and wherein, at the step of (c), the authentication supporting server performs or supports another device to perform a process of applying the hash operation to new feature point information extracted from the second real-time user biometric information, to thereby generate a new hash value and a process of determining whether the second real-time user biometric information is valid by referring to the new hash value and the first modified information.

As one example, at the step of (c), the second real-time user biometric information is image information created by capturing a face of the user and wherein the second real-time user biometric information includes spatial information on the face of the user detected by a ToF (Time of Flight) module, and wherein the authentication supporting server performs or supports another device to perform a process of determining whether the second real-time user biometric information is forged by referring to the spatial information representing distance information from the ToF module to each of points on the face of the user, and in response to determining that the second real-time user biometric information is not forged, a process of determining whether the second real-time user biometric information is valid by referring to the second modified information and the first modified information.

In accordance with another aspect of the present disclosure, there is provided an authentication supporting server for authenticating a user contactlessly based on decentralized identifiers (DID) using a verifiable credential (VC), including: at least one memory that stores instructions; and at least one processor configured to execute the instructions to perform or support another device to perform: (I) on condition that a user DID has been issued through a blockchain network and that a user public key corresponding to the user DID has been registered in the blockchain network, in response to acquiring a contactless authentication request, from a user device, including (1) the user DID, (2) identity confirmation information, (3) first real-time user biometric information, and (4) a user signature value created by signing the first real-time user biometric information with a user private key corresponding to the user public key, (i) one of (i-1) a process of retrieving the user public key from the blockchain network by referring to the user DID and (i-2) (i-2a) a process of allowing a resolving server to retrieve information, corresponding to the user DID, including the user public key registered in the blockchain network by referring to the user DID and thus to generate a user DID document and to transmit the user DID document to the authentication supporting server and (i-2b) a process of retrieving the user public key from the user DID document and (ii) a process of verifying the user signature value by using the user public key and (II) in response to verifying the user signature value, (i) a process of transmitting real-time feature point information extracted from the first real-time user biometric information and the identity confirmation information to a certification authority (CA) server, to thereby allow the CA server to authenticate the identity confirmation information, (ii) a process of allowing the CA server to transmit authentication result information, including (1) a CA server DID, (2) first modified information created by modifying the real-time feature point information, and (3) a CA server signature value created by signing the first modified information with a CA server private key, to the authentication supporting server, according to an authentication result of the identity confirmation information, (iii) in response to acquiring the authentication result information, one of (iii-1) a process of retrieving a CA server public key from the blockchain network by referring to the CA server DID and (iii-2) (iii-2a) a process of allowing the resolving server to retrieve information, corresponding to the CA server DID, including the CA server public key registered in the blockchain network by referring to the CA server DID and thus to generate a CA server DID document and to transmit the CA server DID document to the authentication supporting server and (iii-2b) a process of retrieving the CA server public key from the CA server DID document, (iv) a process of verifying the CA server signature value by using the CA server public key, (v) in response to verifying the CA server signature value, a process of registering the authentication result information in the blockchain network, and (vi) a process of transmitting a user verifiable credential about the authentication result information registered in the blockchain network to the user device.

As one example, the identity confirmation information is certificate identity information of the user, and wherein, at the process of (I), the processor performs or supports another device to perform (i) a process of determining whether the first real-time user biometric information is forged and (ii) in response to determining that the first real-time user biometric information is not forged, a process of determining whether the first real-time user biometric information corresponds to certificate user biometric information by referring to (1) certificate identity feature point information extracted from the certificate user biometric information included in the certificate identity information and (2) the real-time feature point information, to thereby confirm whether the first real-time user biometric information is valid.

As one example, the user device creates the first real-time user biometric information by capturing a face of the user and wherein the first real-time user biometric information includes spatial information on the face of the user detected by a ToF (Time of Flight) module of the user device and wherein, at the process of (I), the processor performs or supports another device to perform a process of determining whether the first real-time user biometric information is forged by referring to the spatial information representing distance information from the user device to each of points on the face of the user.

As one example, the certificate user biometric information is facial image information on the user which is included in the certificate identity information and wherein the first real-time user biometric information is real-time image information created by capturing a face of the user in response to a request for the first real-time user biometric information from the authentication supporting server.

As one example, at the process of (I), the processor performs or supports another device to perform (i) a process of inputting (1) the facial image information included in the certificate identity information and (2) the real-time image information into a convolutional layer, to thereby allow the convolutional layer to apply at least one convolution operation to each of the facial image information and the real-time image information and thus to output a facial feature map and a real-time feature map respectively corresponding to the facial image information and the real-time image information, (ii) a process of inputting the facial feature map and the real-time feature map into an RPN, to thereby allow the RPN to output proposal boxes, corresponding to a facial area of the user, on the facial feature map and the real-time feature map, (iii) a process of inputting the proposal boxes into a pooling layer, to thereby allow the pooling layer to apply at least one pooling operation to regions, respectively corresponding to the proposal boxes, on the facial feature map and the real-time feature map and thus to (iii-1) generate pooled feature maps and to (iii-2) output a facial feature vector and a real-time feature vector respectively corresponding to the pooled feature maps, (iv) a process of inputting the facial feature vector and the real-time feature vector into an FC layer, to thereby allow the FC layer to output a first score and a second score respectively corresponding to the facial feature vector and the real-time feature vector, and (v) a process of confirming whether the first real-time user biometric information is valid by referring to the first score and the second score.

As one example, the identity confirmation information is certificate identity information of the user, and wherein, at the process of (II), the processor performs or supports another device to perform a process of allowing the CA server to (i) extract certificate identity feature point information from the certificate identity information, (ii) extract identity registry feature point information from identity registry information corresponding to the certificate identity information, and (iii) determine whether the certificate identity information corresponds to the identity registry information by referring to the certificate identity feature point information and the identity registry feature point information, to thereby authenticate the certificate identity information.

As one example, the processor further performs or supports another device to perform a process of: (III) on condition that (III-1) a service request is transmitted from the user device to a service providing server, (III-2) a contactless authentication request for the first real-time user biometric information is transmitted from the service providing server to the user device wherein the first real-time user biometric information is used for providing a service of the service providing server to the user device, (III-3) the user DID and the user verifiable credential about the first real-time user biometric information is transmitted from the user device to the service providing server, and (III-4) an authentication request for the user verifiable credential is acquired from the service providing server wherein the authentication request includes (1) the user DID, (2) the user verifiable credential, and (3) a VC user signature value created by signing the user verifiable credential with the user private key, (i) one of (i-1) a process of retrieving the user public key from the blockchain network by referring to the user DID and (i-2) (i-2a) a process of allowing the resolving server to retrieve the information, corresponding to the user DID, including the user public key registered in the blockchain network by referring to the user DID and thus to generate the user DID document and to transmit the user DID document to the authentication supporting server and (i-2b) a process of retrieving the user public key from the user DID document, (ii) a process of verifying the VC user signature value by using the user public key, (iii) in response to acquiring the user verifiable credential as a result of verifying the VC user signature value, one of (iii-1) a process of retrieving the CA server public key from the blockchain network by referring to the CA server DID included in the user verifiable credential and (iii-2) (iii-2a) a process of allowing the resolving server to retrieve the information, corresponding to the CA server DID, including the CA server public key registered in the blockchain network by referring to the CA server DID and thus to generate the CA server DID document and to transmit the CA server DID document to the authentication supporting server and (iii-2b) a process of retrieving the CA server public key from the CA server DID document, (iv) a process of verifying the CA server signature value included in the user verifiable credential by using the CA server public key, (v) in response to acquiring the first modified information as a result of verifying the CA server signature value, a process of transmitting a request for authentication information to the user device, (vi) in response to acquiring second real-time user biometric information as the authentication information from the user device, a process of determining whether the second real-time user biometric information is valid by referring to (1) second modified information created by modifying new feature point information extracted from the second real-time user biometric information and (2) the first modified information, and (vii) in response to confirming that the second real-time user biometric information is valid, a process of transmitting a contactless authentication result, corresponding to the contactless authentication request, to the service providing server.

As one example, the first modified information is created by applying hash operation to the real-time feature point information extracted from the first real-time user biometric information and wherein, at the process of (III), the processor performs or supports another device to perform a process of applying the hash operation to new feature point information extracted from the second real-time user biometric information, to thereby generate a new hash value and a process of determining whether the second real-time user biometric information is valid by referring to the new hash value and the first modified information.

As one example, at the process of (III), the second real-time user biometric information is image information created by capturing a face of the user and wherein the second real-time user biometric information includes spatial information on the face of the user detected by a ToF (Time of Flight) module, and wherein the processor performs or supports another device to perform a process of determining whether the second real-time user biometric information is forged by referring to the spatial information representing distance information from the ToF module to each of points on the face of the user, and in response to determining that the second real-time user biometric information is not forged, a process of determining whether the second real-time user biometric information is valid by referring to the second modified information and the first modified information.

BRIEF DESCRIPTION OF THE DRAWINGS

The following drawings to be used for explaining example embodiments of the present disclosure are only part of example embodiments of the present disclosure and other drawings can be obtained based on the drawings by those skilled in the art of the present disclosure without inventive work.

FIGS. 4 and 5 are drawings schematically illustrating processes of matching faces in accordance with one example embodiment of the present disclosure.

FIGS. 6A to 6F are drawings schematically illustrating processes of confirming whether contactless authentication information is real-time in accordance with one example embodiment of the present disclosure.

DETAILED DESCRIPTION OF THE PREFERRED EMBODIMENTS

Figure 1:
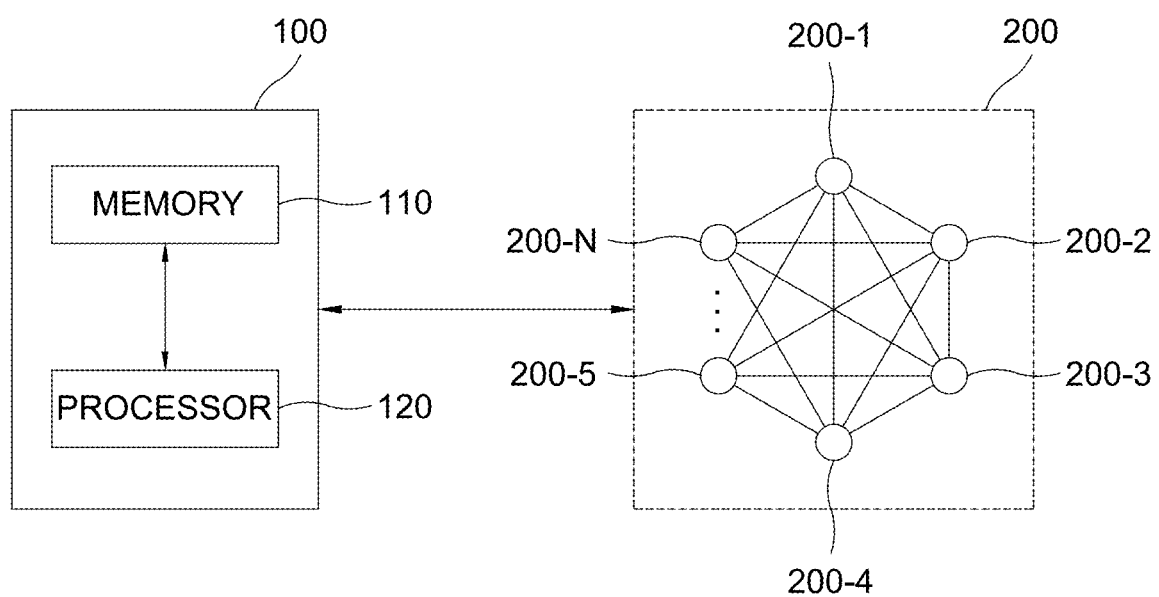
FIG. 1 is a drawing schematically illustrating (i) an authentication supporting server for authenticating a user contactlessly based on decentralized identifiers (DIDs) using a user verifiable credential and (ii) a blockchain network in accordance with one example embodiment of the present disclosure.
Figure 2:
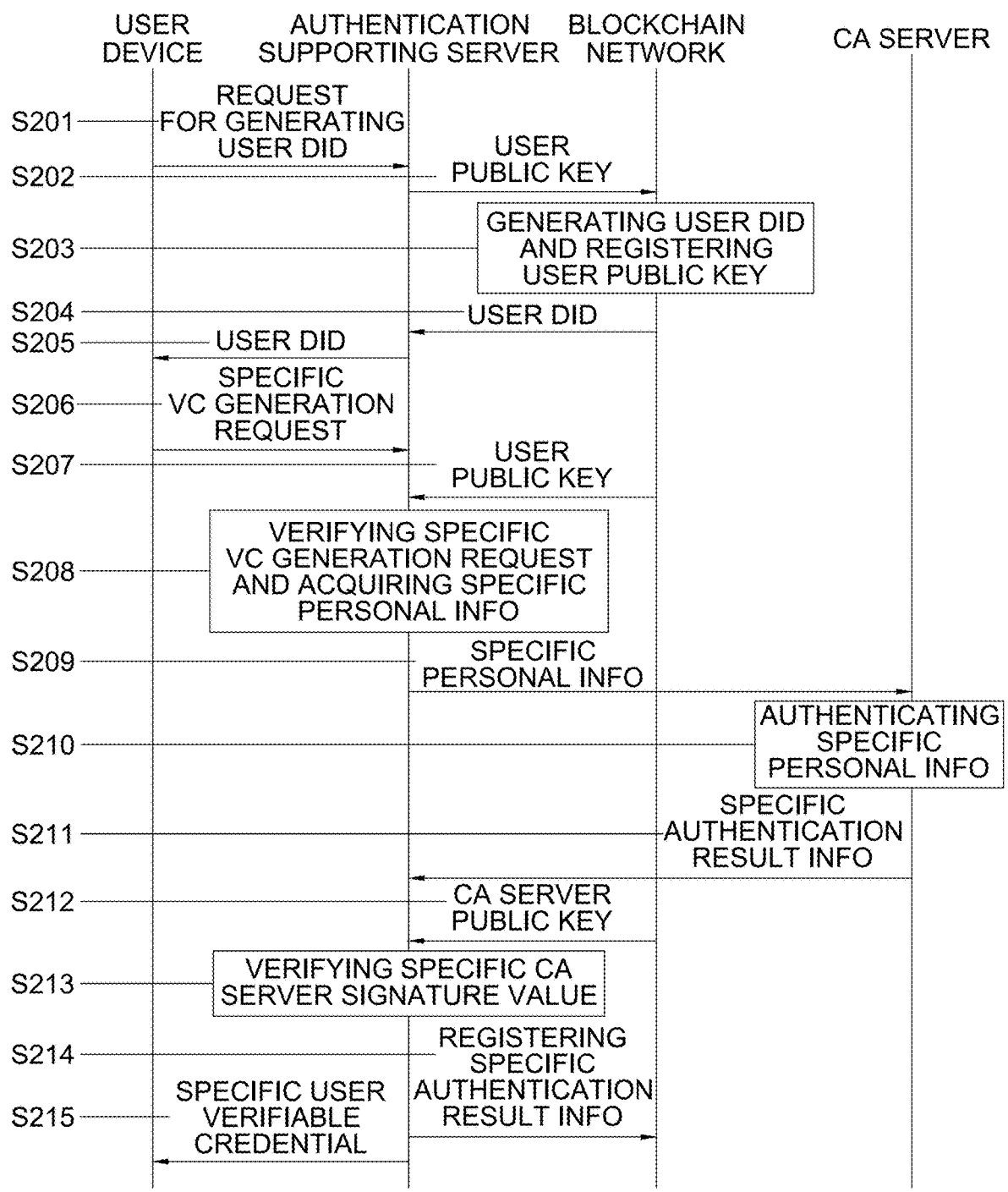
FIG. 2 is a drawing schematically illustrating processes of generating a user DID in the method of authenticating the user contactlessly based on the decentralized identifiers using the user verifiable credential in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the present disclosure.

Besides, in the detailed description and claims of the present disclosure, a term "include" and its variations are not intended to exclude other technical features, additions, components or steps. Other objects, benefits and features of the present disclosure will be revealed to those skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to the present disclosure to be carried out easily, the example embodiments of the present disclosure by referring to attached diagrams will be explained in detail as shown below.

FIG. 1 is a drawing schematically illustrating (i) an authentication supporting server for authenticating a user contactlessly based on decentralized identifiers using a user verifiable credential (VC) and (ii) a blockchain network in accordance with one example embodiment of the present disclosure.

By referring to FIG. 1, the authentication supporting server may include a memory 110 which stores instructions to issue the user verifiable credential for authenticating a user contactlessly based on decentralized identifiers (DIDs), and a processor 120 which performs processes of issuing the user verifiable credential for authenticating the user contactlessly based on the DIDs according to the instructions in the memory 110. Herein, the authentication supporting server 100 may include a personal computer (PC), a mobile computer, etc.

Specifically, the authentication supporting server 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include operating system (OS) and software configuration of applications that achieve specific purposes.

Such description of the computing device does not exclude an integrated device including any combination of a processor, a memory, a medium, or any other computing components for implementing the present disclosure.

For reference, the authentication supporting server 100 may be a server corresponding to one of blockchain nodes in the blockchain network 200, or may be a server managing said one of the blockchain nodes.

Meanwhile, the blockchain network 200 may include at least one of the blockchain nodes 200-1, 200-2, . . . , and 200-n, and each of the blockchain nodes 200-1, 200-2, . . . , and 200-n may be a computing device including a memory and a processor.

Herein, the memory in the computing device may store instructions, and in detail, the instructions may be computer software generated to allow at least one of the blockchain nodes in the blockchain network 200 to function in a specific way, and may be stored in the memory usable or readable by a computer, i.e., a programmable data processing device, or in the computer. The instructions may perform processes for executing functions shown in the drawings.

Also, the processors of such devices may include hardware configuration of MPU (Micro Processing Unit) or CPU (Central Processing Unit), cache memory, data bus, etc. Additionally, the computing device may further include operating system (OS) and software configuration of applications that achieve specific purposes.

Such description of the computing device does not exclude an integrated device including any combination of a processor, a memory, a medium, or any other computing components for implementing the present disclosure.

Processes of generating a user DID in the method for authenticating the user contactlessly based on the decentralized identifiers using the user verifiable credential by the authentication supporting server 100 and the blockchain network 200 configured as such in accordance with one example embodiment of the present disclosure are described below.

First, on condition that a user private key of a user and a user public key corresponding to the user private key have been generated, (i) a user device may transmit a request for generating the user DID including the user public key at a step of S201, (ii) the user public key may be transmitted to the blockchain network 200 at a step of S202 and registered in the blockchain 200, and (iii) the user DID corresponding to the user public key may be issued by using the blockchain 200 at steps of S203, S204, and S205. Herein, the request for generating the user DID may include a signature value created by using the user private key, and the blockchain network 200 may verify the signature value by using the user public key included in the request for generating the user DID, to thereby verify whether the request for generating the user DID is created by the user.

And in response to acquiring a specific VC generation request from a user device, including (1) the user DID, (2) specific personal information of the user, for example, an SSN of the user, and (3) a specific user signature value created by signing the specific personal information with the user private key, at a step of S206, the authentication supporting server 100 may perform or support another device to perform (i) one of (i-1) a process of retrieving the user public key from the blockchain network 200 by referring to the user DID and (i-2) (i-2a) a process of allowing a resolving server to retrieve information, corresponding to the user DID, including the user public key registered in the blockchain network 200 by referring to the user DID and thus to generate a user DID document and to transmit the user DID document to the authentication supporting server 100 and (i-2b) a process of retrieving the user public key from the user DID document at a step of S207 and (ii) a process of verifying the user signature value by using the user public key.

And, in response to verifying the specific user signature value at a step of S208, the authentication supporting server 100 may perform or support another device to perform (i) a process of transmitting the specific personal information to a certification authority (CA) server which manages information corresponding to the specific personal information, at a step of S209, (ii) a process of allowing the CA server to authenticate the specific personal information at a step of S210, and (iii) in response to verifying the specific personal information, a process of allowing the CA server to transmit specific authentication result information, including (1) a CA server DID, (2) specific modified information created by modifying the specific personal information, and (3) a specific CA server signature value created by signing the specific modified information with a CA server private key, to the authentication supporting server 100 at a step of S211.

And, in response to acquiring the specific authentication result information, the authentication supporting server 100 may perform or support another device to perform one of (i) a process of retrieving a CA server public key from the blockchain network 200 by referring to the CA server DID and (ii) (ii-1) a process of allowing the resolving server to retrieve information, corresponding to the CA server DID, including the CA server public key registered in the blockchain network 200 by referring to the CA server DID and thus to generate a CA server DID document and to transmit the CA server DID document to the authentication supporting server 100 and (ii-2) a process of retrieving the CA server public key from the CA server DID document, at a step of S212.

And, the authentication supporting server 100 may perform or support another device to perform (i) a process of verifying the specific CA server signature value by using the CA server public key at a step of S213, (ii) a process of registering the specific authentication result information in the blockchain network in response to verifying the specific CA server signature value, at a step of S214, and (iii) a process of transmitting a specific user verifiable credential about the specific authentication result information registered in the blockchain network to the user device, at a step of S215.

On condition that the user DID has been issued and that the specific user verifiable credential corresponding to the user DID has been transmitted to the user device as such, the user may want an additional user verifiable credential to be issued by using his/her biometric information.

Figure 3:
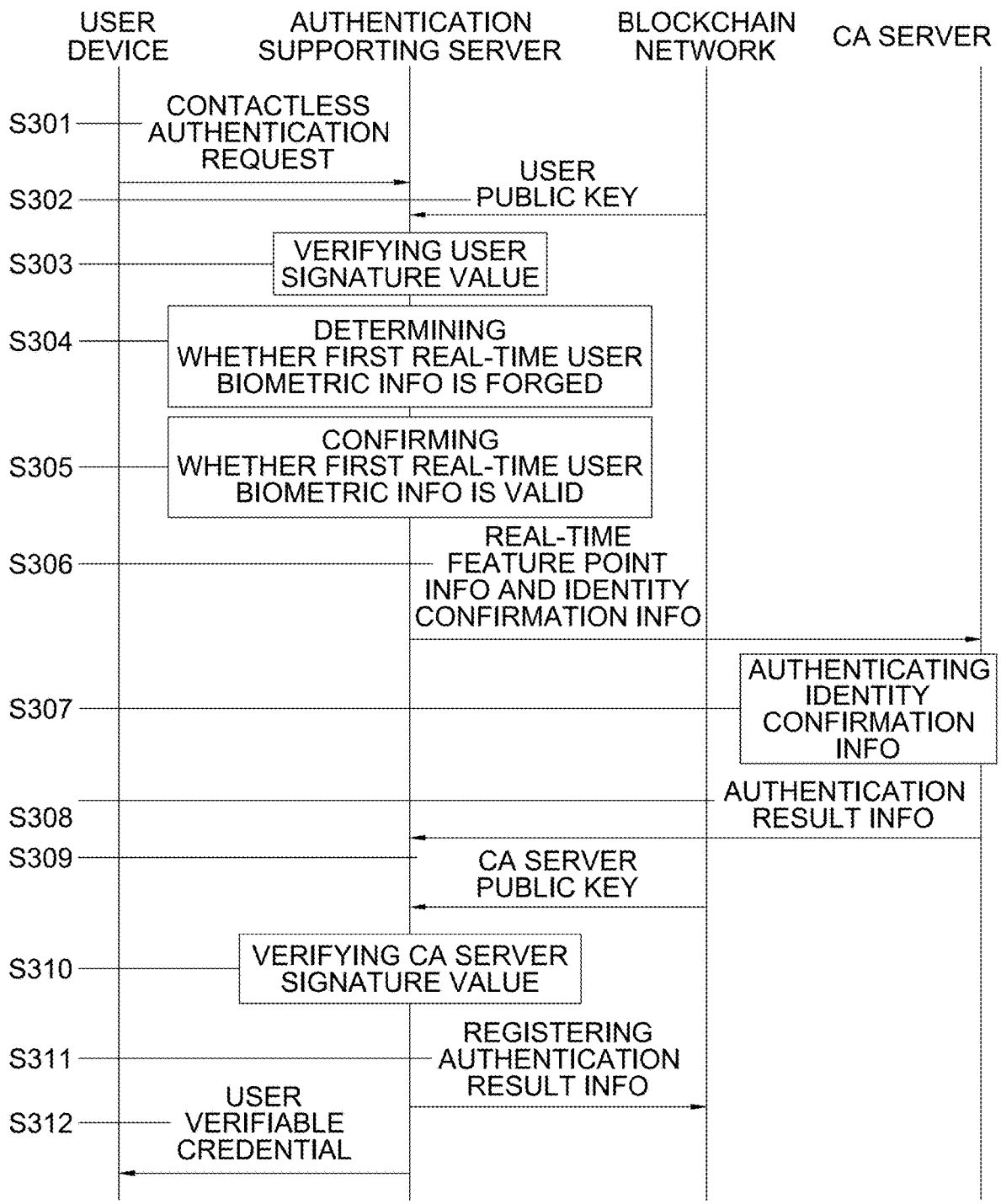
FIG. 3 is a drawing schematically illustrating processes of issuing the user verifiable credential in accordance with one example embodiment of the present disclosure.

Thus, by referring to FIG. 3, processes of issuing the user verifiable credential in accordance with one example embodiment of the present disclosure are described in detail.

The user device may perform or support another device to perform a process of transmitting a contactless authentication request, including (1) the user DID, (2) identity confirmation information, (3) first real-time user biometric information, and (4) a user signature value created by signing the first real-time user biometric information with the user private key, to the authentication supporting server at a step of S301.

Herein, the identity confirmation information may be certificate identity information including certificate user biometric information.

As an example, the certificate identity information may be an identification card including a user's facial image, such as at least one of a resident registration certificate, a driver's license, a passport, and an identification card for minors, but it is not limited thereto, and any identification indicating the user's identity may be the certificate identity information.

Also, the first real-time user biometric information may include additional user biometric information (e.g., second user biometric information) acquired together with the certificate user biometric information (e.g., first user biometric information) already included in the certificate identity information, in order to issue the user verifiable credential.

As an example, the first real-time user biometric information may be facial image information created by capturing a facial area of the user from the user device.

Meanwhile, the biometric information may include at least part of iris information, retina information, voice information, DNA pattern information, hand shape information, vein information, fingerprint information and face information.

However, the biometric information above describes examples for convenience of understanding, and the scope of the present disclosure is not limited thereto.

For convenience, the explanation will mainly focus on the facial image information on the user's face, but this is only an example, and the embodiment of the present disclosure is not limited thereto.

In response to acquiring a contactless authentication request, the authentication supporting server 100 may perform or support another device to perform (i) one of (i-1) a process of retrieving the user public key from the blockchain network 200 by referring to the user DID and (i-2) (i-2a) a process of allowing the resolving server to retrieve information, corresponding to the user DID, including the user public key registered in the blockchain network 200 by referring to the user DID and thus to generate a user DID document and to transmit the user DID document to the authentication supporting server 100 and (i-2b) a process of retrieving the user public key from the user DID document at a step of S302 and (ii) a process of verifying the user signature value by using the user public key at a step of S303.

As an example, the authentication supporting server 100 may perform or support another device to perform a process of decrypting the user signature value with the user public key, to thereby acquire the first real-time user biometric information included in the user signature value and a process of verifying the user signature value by determining whether (1) the first real-time user biometric information acquired from the user signature value included in the contactless authentication request is identical to (2) the first real-time user biometric information included in the contactless authentication request from the user device.

Herein, the authentication supporting server 100 may perform or support another device to perform (i) a process of determining whether the first real-time user biometric information is forged by using face recognition technology, etc. at a step of S304 and (ii) in response to determining that the first real-time user biometric information is not forged, a process of determining whether the first real-time user biometric information corresponds to the certificate user biometric information by referring to (1) certificate identity feature point information extracted from the certificate user biometric information included in the certificate identity information and (2) the real-time feature point information, to thereby confirm whether the first real-time user biometric information is valid, at a step of S305.

Below, a method by the authentication supporting server of determining whether the contactless authentication information is real-time, that is, whether the first real-time user biometric information is not forged and of determining whether the first real-time user biometric information is valid, will be exemplarily described.

For reference, the method is described under the assumption that the certificate user biometric information, which is included in the certificate identity information of the user, is the facial image information on the user and that the first real-time user biometric information is real-time image information created by capturing a face of the user in real-time in response to a request for the first real-time user biometric information from the authentication supporting server 100.

Figure 4:
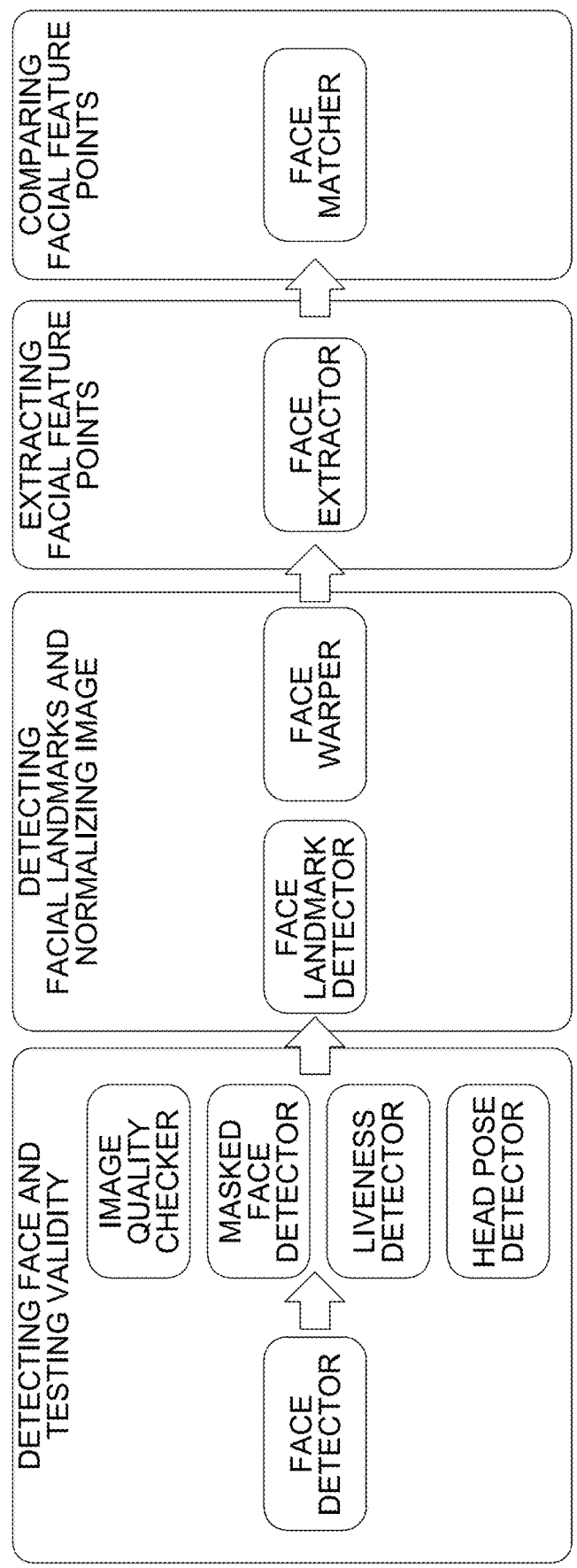
Figure 6A:
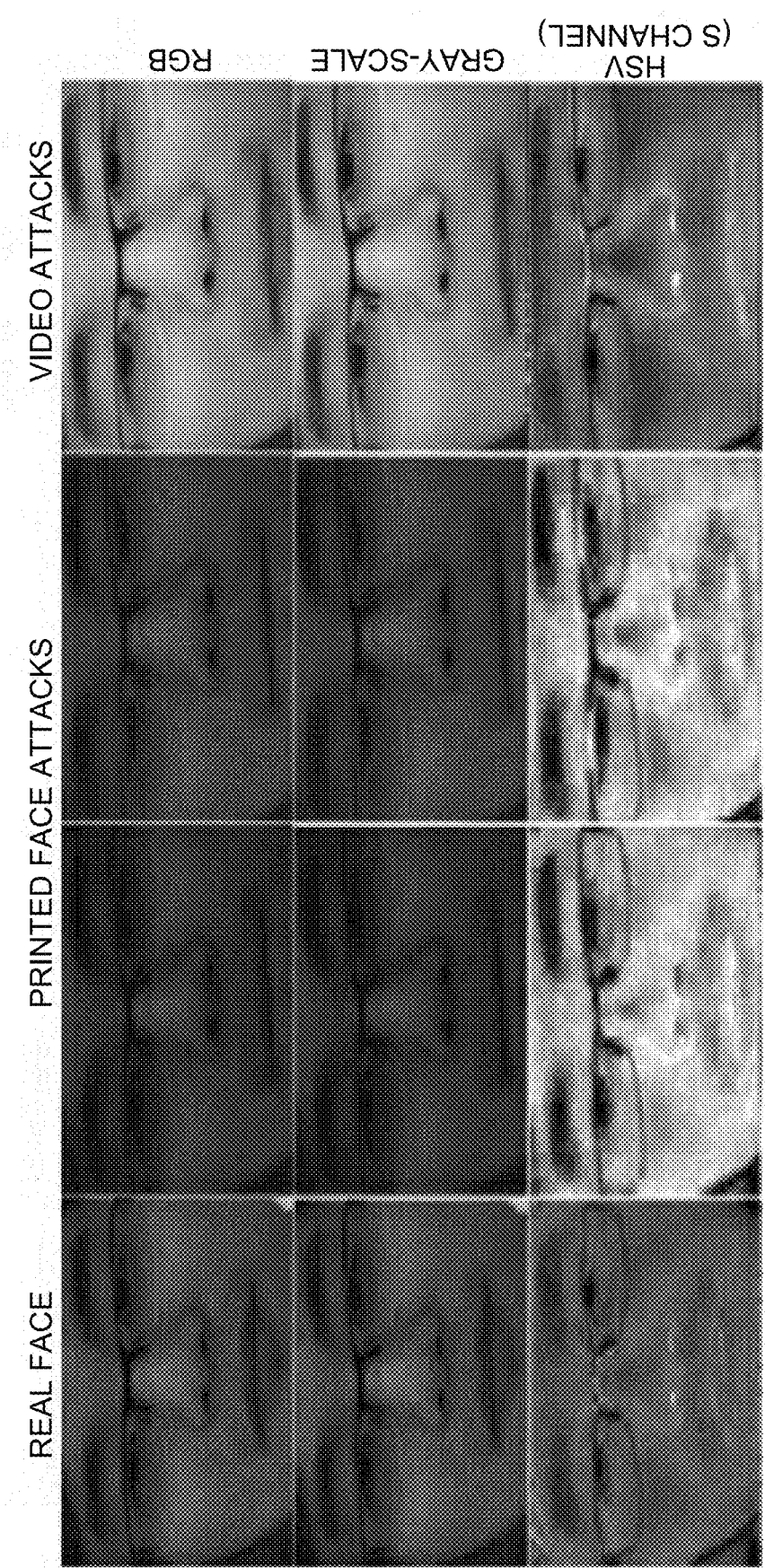
Figure 6C:
Figure 6D:
Figure 6F:
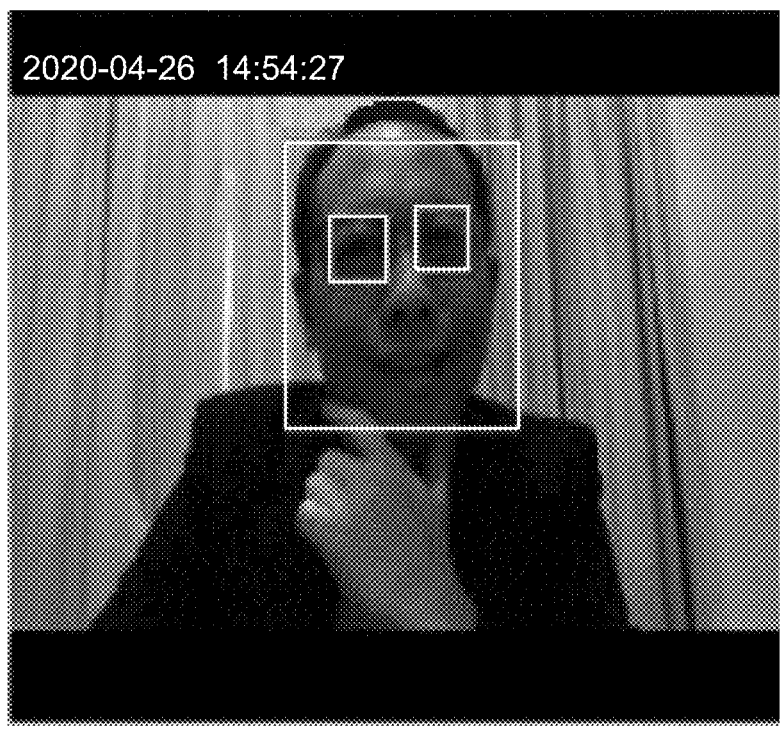

First, for convenience of understanding, by referring to FIGS. 4 and 5, processes of matching faces in accordance with one example embodiment of the present disclosure are exemplarily described.

By referring to FIG. 4, (i) a face is detected from a facial image showing a user's face, (ii) whether the facial image is forged is determined, (iii) facial landmarks are detected and the facial image is normalized, (iv) facial feature points are extracted, and (v) the extracted facial feature points are compared with facial feature points previously stored in the database.

By referring to FIG. 5, each part where facial features change, such as eyes, eyebrows, a nose, a mouth, a chin, etc., is analyzed in the facial image captured by an image sensor, for example, a camera, and the facial feature points are extracted from the captured facial image. Then, the same process is performed on the facial image stored in the database, so that the facial feature points are extracted from the facial image stored in the database. Then, by comparing (1) the facial feature points extracted from the captured facial image and (2) the facial feature points extracted from the facial image stored in the database, whether the user on the image captured by the camera is the same as the user on the image previously stored in the database is determined.

Next, a method for determining whether the contactless authentication information is real-time, that is, whether it is forged or not, will be exemplarily described.

For reference, a forgery technique, i.e., a spoofing attack, for neutralizing the facial recognition technique includes a photo attack, a video replay attack, a 3D mask attack, and the like.

The authentication supporting server may use various detection techniques to cope with the spoofing attack as such.

As examples of methods for coping with the spoofing attacks, a detection technique using texture information, a detection technique using frequency information, a detection technique using variable focus information, a detection technique using RGB camera information, a detection technique using IR information, and a detection technique using gesture-based information are illustrated by referring to FIGS. 6A to 6F which show the processes of determining whether the contactless authentication information is real-time in the method for authenticating the user contactlessly based on the DIDs using the user verifiable credential in accordance with one example embodiment of the present disclosure.

As another example, whether the first real-time user biometric information, e.g., the facial image information on the user, is forged may be determined by using multi-channel image information outputted from the deep neural network.

Figure 7:
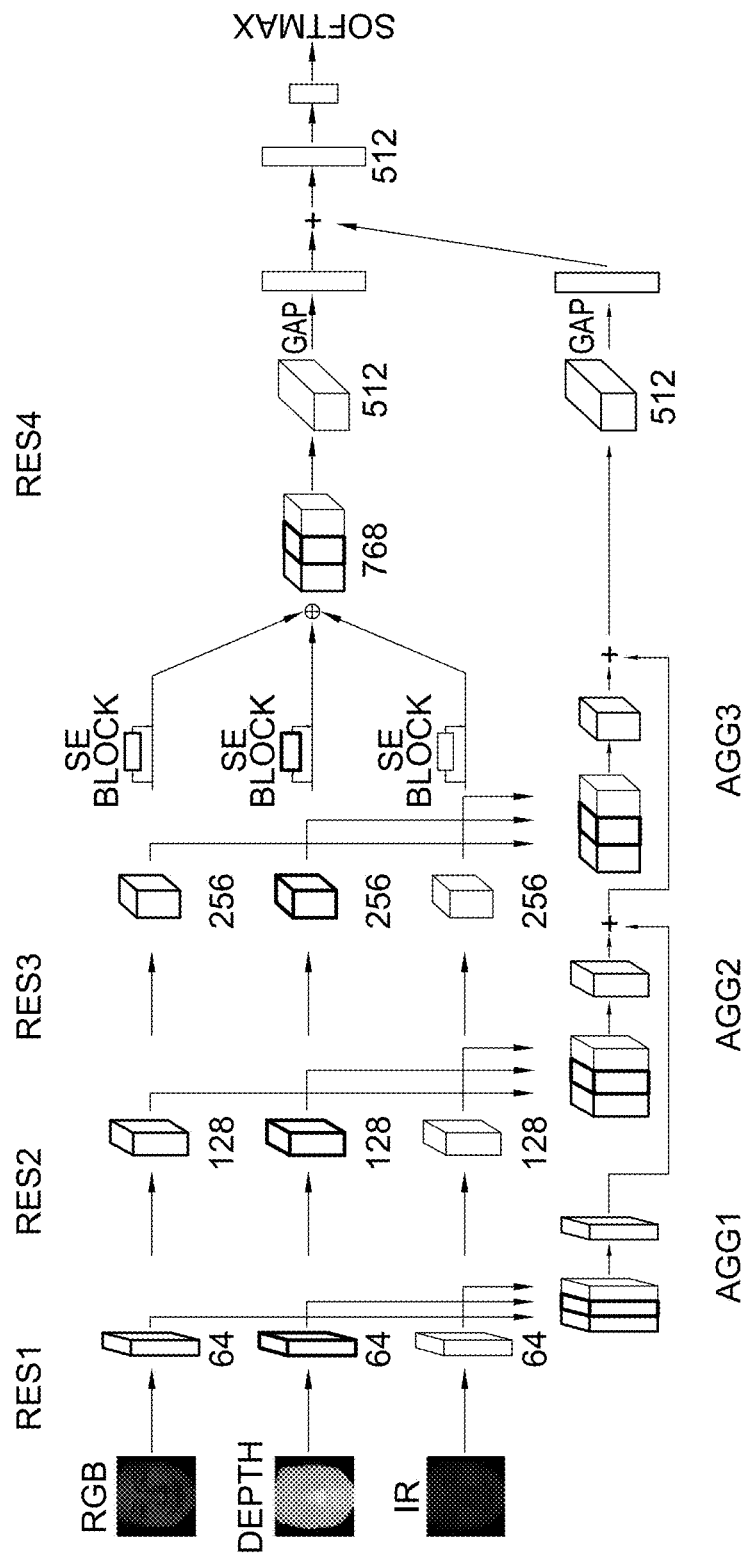
FIG. 7 is a drawing schematically illustrating processes of outputting multi-channel image information by a deep neural network for confirming whether the contactless authentication information is real-time in accordance with one example embodiment of the present disclosure.

As an example, by referring to FIG. 7, processes of outputting the multi-channel image information by the deep neural network for confirming whether the contactless authentication information is real-time in accordance with the present disclosure are illustrated.

Thus, based on the deep structure of the deep neural network, whether the contactless authentication information forged by various methods is in real-time may be effectively determined.

As an example of determining whether the contactless authentication information is real-time in accordance with the present disclosure, the user device creates the first real-time user biometric information by capturing a face of the user and if the first real-time user biometric information includes spatial information on the face of the user detected by a ToF (Time of Flight) module of the user device, the authentication supporting server 100 may perform or support another device to perform a process of determining whether the first real-time user biometric information is forged by referring to the spatial information representing distance information from the user device to each of points on the face of the user.

Herein, the ToF technology used in the ToF module is a 3D sensing technology that recognizes the sense of volume, spatial information, and movement of an object by calculating the distance based on the time the light emitted toward the subject bounces back.

The authentication supporting server may perform detection using a depth value with the ToF module as such, thereby increasing the accuracy of the face recognition and ensuring high stability against various spoofing attacks.

Figure 8:
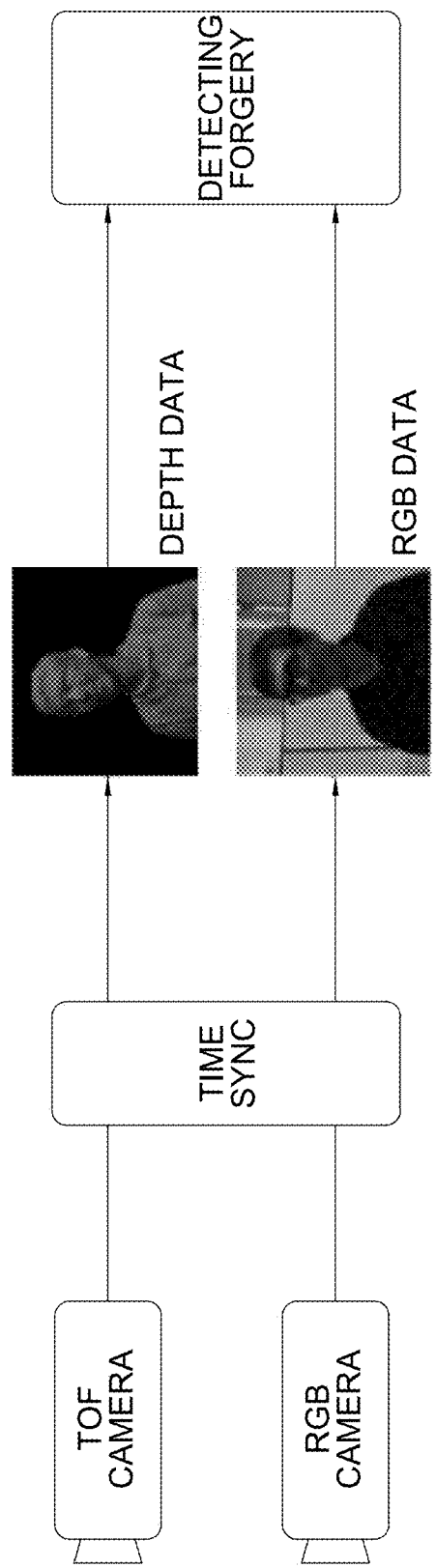
FIGS. 8 and 9 are drawings schematically illustrating processes of determining spoofing attacks by using a ToF (Time of Flight) camera in accordance with one example embodiment of the present disclosure.
Figure 9:
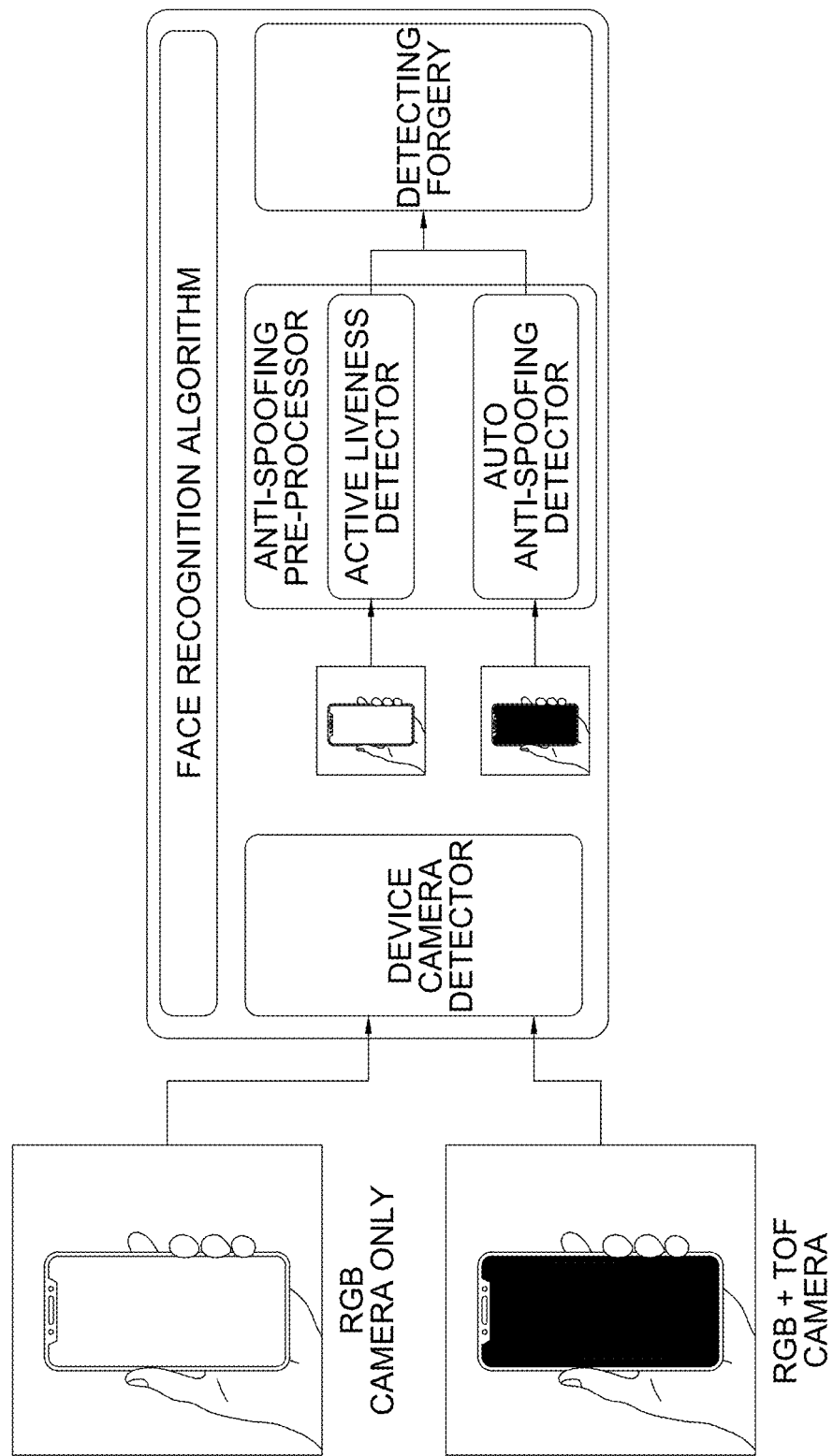

Also, by referring to FIGS. 8 and 9, exemplar processes of determining the spoofing attacks by using input images respectively from the RGB camera and the ToF camera in accordance with one example embodiment of the present disclosure are illustrated.

Figure 10:
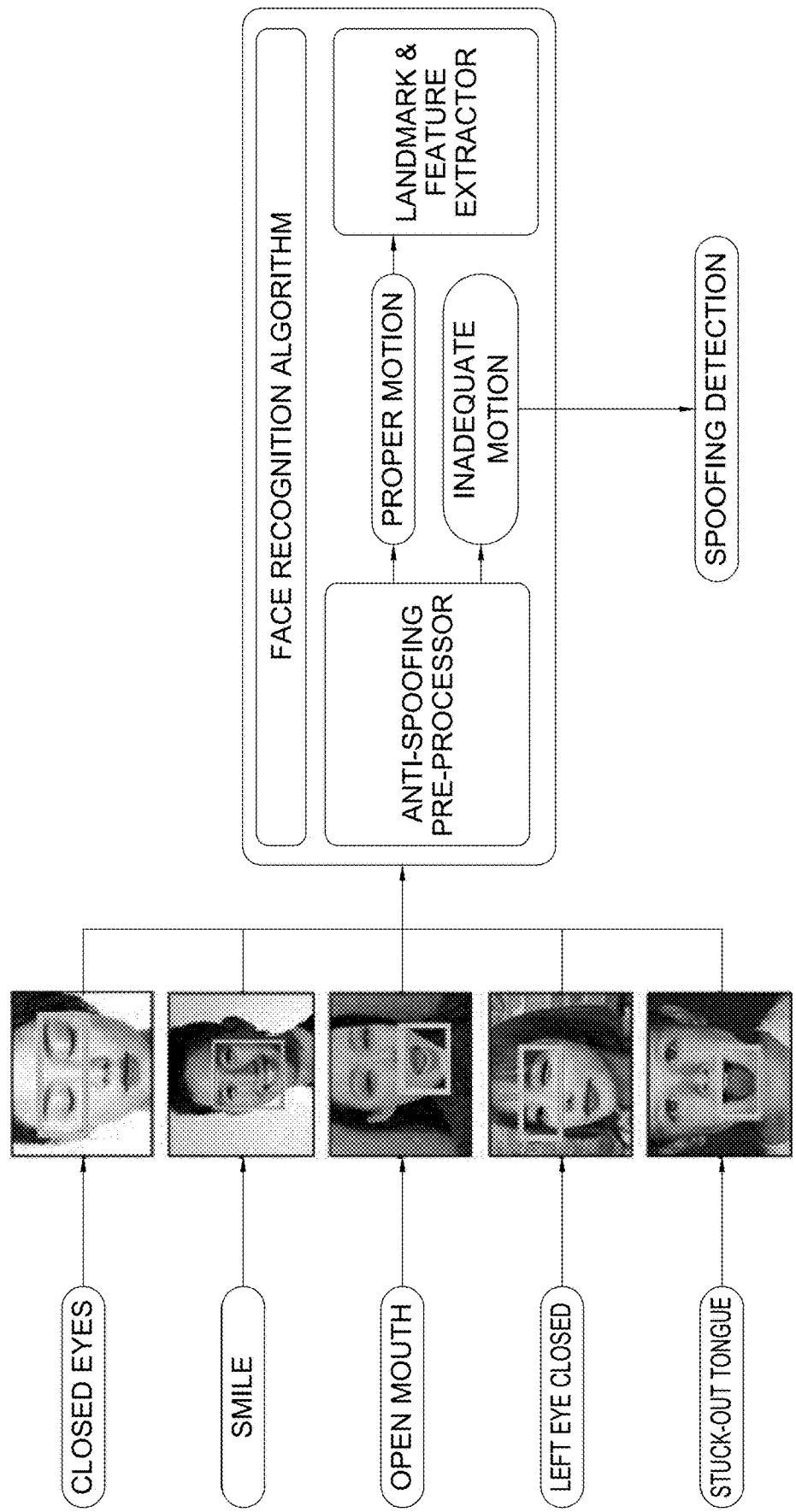
FIG. 10 is a drawing schematically illustrating processes of determining the spoofing attacks by using active liveness detection if an input image is acquired from an RGB camera in accordance with one example embodiment of the present disclosure.

Also, by referring to FIG. 10, in a method for authenticating the user contactlessly based on the DIDs using the verifiable credential, if there is only the RGB camera without the ToF module for acquiring spatial information (or distance information), an exemplary process in which the active liveness detection is performed is shown as one of examples for coping with the spoofing attacks.

Also, through dynamic anti-spoofing switching technology, a suitable anti-spoofing technique may be selected among various anti-spoofing techniques according to hardware performance of the user device.

For reference, the deep neural network for determining whether the contactless authentication information is real-time and the deep neural network, to be described later, for determining whether the contactless authentication information is valid may be separate neural networks, but the scope of the present disclosure is not limited thereto, and a single deep neural network may be used for determining whether the contactless authentication information is real-time and valid.

Figure 11:
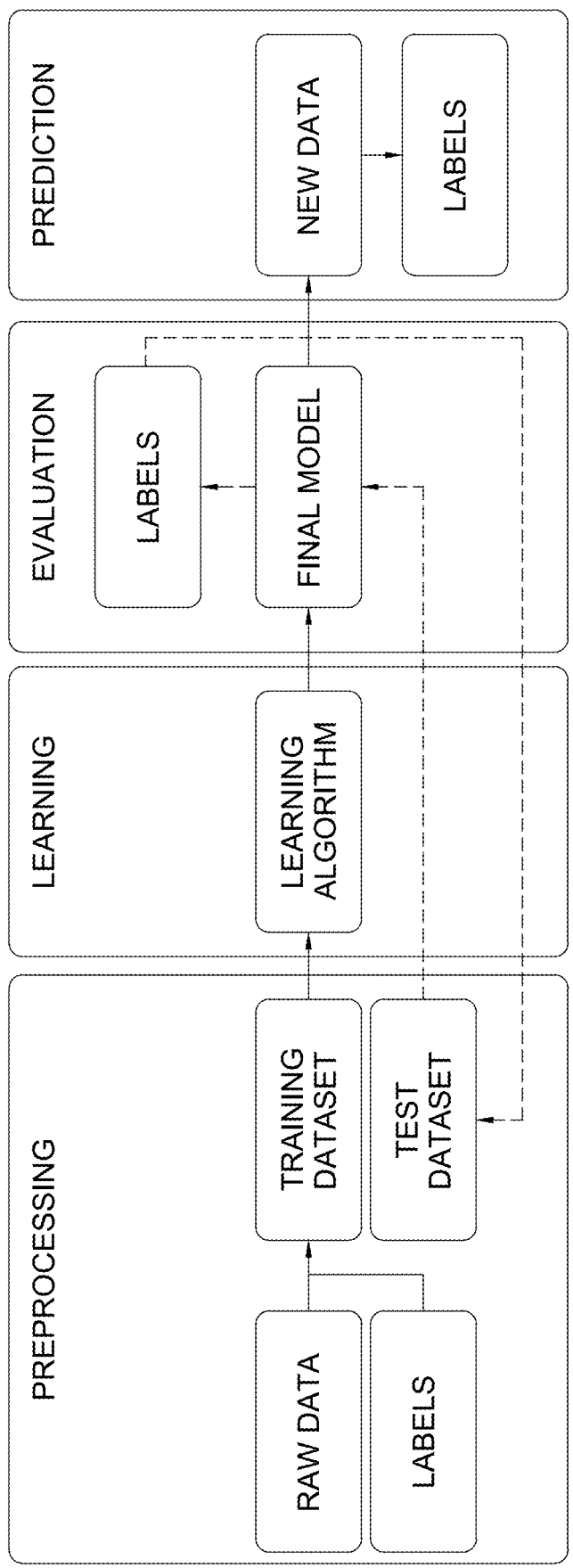
FIG. 11 is a drawing schematically illustrating processes of improving performance of a face recognition algorithm in accordance with one example embodiment of the present disclosure.

Also, by referring to FIG. 11, processes of improving performance of the face recognition algorithm in accordance with one example embodiment of the present disclosure are illustrated.

Figure 12:
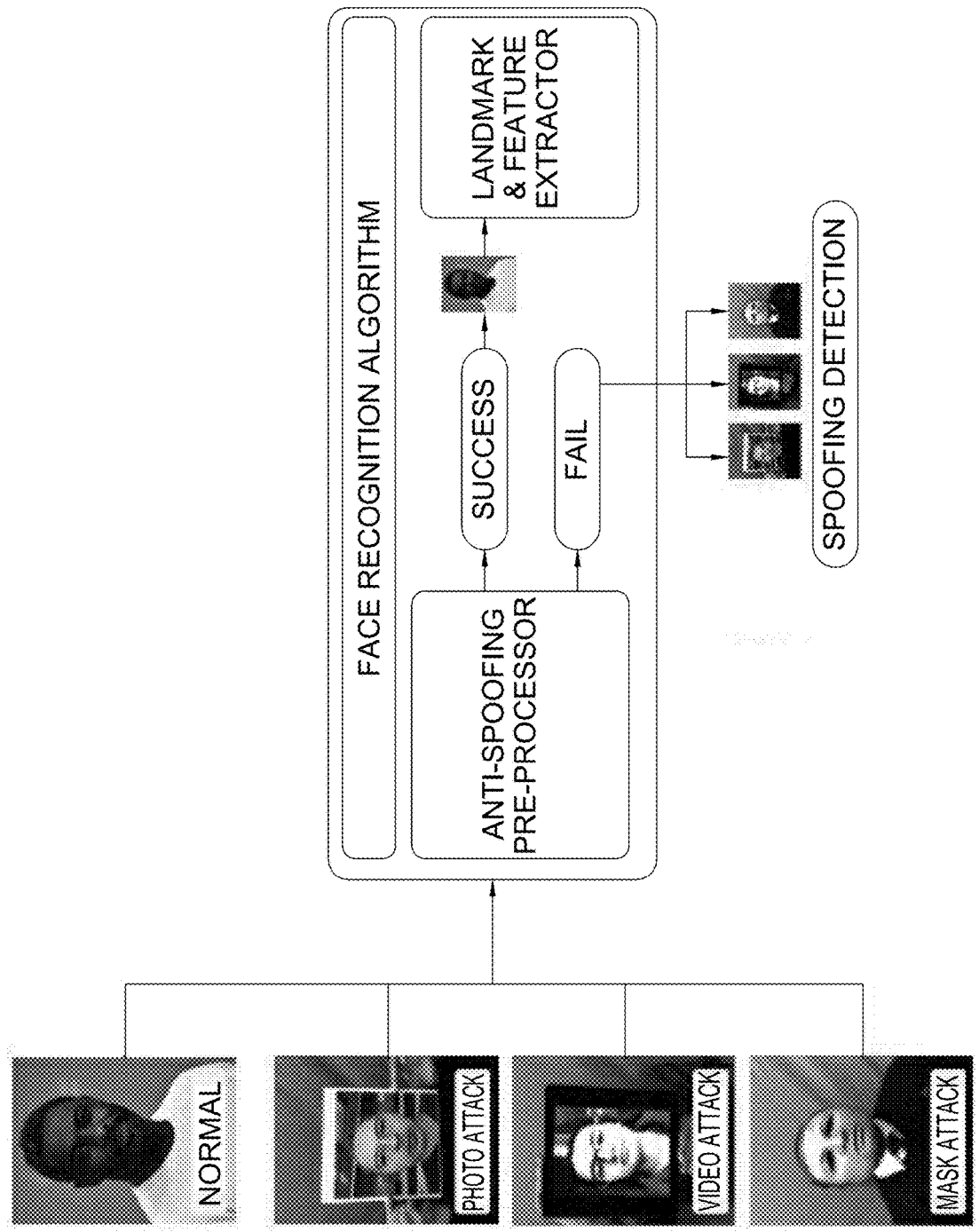
FIG. 12 is a drawing schematically illustrating processes of extracting features of the contactless authentication information on users after confirming whether the contactless authentication information is real-time in accordance with one example embodiment of the present disclosure.

Also, by referring to FIG. 12, processes of extracting features of the contactless authentication information on the users after confirming whether the contactless authentication information is real-time in accordance with one example embodiment of the present disclosure are illustrated.

Below, a method for determining whether the contactless authentication information is valid by extracting the features of the contactless authentication information will be described in detail.

The authentication supporting server 100 may determine whether the first real-time user biometric information is valid by analyzing the first real-time user biometric information (that is, the contactless authentication information), for example, the facial image information.

As an example, the authentication supporting server 100 may analyze each part where the facial features change, such as eyes, eyebrows, a nose, a mouth, a chin, etc., which is indicated by the user's facial image information, may extract characteristic data, and may determine whether the first real-time user biometric information is valid by referring to the extracted facial features.

In detail, the authentication supporting server 100 may perform or support another device to perform a process of inputting (1) the facial image information included in the certificate identity information and (2) the real-time image information into a convolutional layer, to thereby allow the convolutional layer to apply at least one convolution operation respectively to the facial image information and the real-time image information and thus to output a facial feature map and a real-time feature map respectively corresponding to the facial image information and the real-time image information.

Then, the authentication supporting server 100 may perform or support another device to perform a process of inputting the facial feature map and the real-time feature map into a region proposal network (RPN), to thereby allow the RPN to output proposal boxes, corresponding to a facial area of the user, on the facial feature map and the real-time feature map.

Then, the authentication supporting server 100 may perform or support another device to perform a process of inputting the proposal boxes into a pooling layer, to thereby allow the pooling layer to apply at least one pooling operation to regions, respectively corresponding to the proposal boxes, on the facial feature map and the real-time feature map and thus to generate pooled feature maps and to output a facial feature vector and a real-time feature vector respectively corresponding to the pooled feature maps.

And, the authentication supporting server 100 may perform or support another device to perform (i) a process of inputting the facial feature vector and the real-time feature vector into a fully-connected (FC) layer, to thereby allow the FC layer to output a first score and a second score respectively corresponding to the facial feature vector and the real-time feature vector, and (ii) a process of confirming whether the first real-time user biometric information is valid by referring to the first score and the second score.

And, in response to verifying the user signature value, the authentication supporting server 100 may perform or support another device to perform a process of transmitting (1) the real-time feature point information extracted from the first real-time user biometric information and (2) the identity confirmation information to the CA server at a step of S306, to thereby allow the CA server to authenticate the identity confirmation information at a step of S307.

As an example, the authentication supporting server 100 may perform or support another device to perform a process of allowing the CA server to (i) extract certificate identity feature point information from the identity confirmation information, i.e., from the certificate identity information and (ii) extract identity registry feature point information from identity registry information corresponding to the certificate identity information. And, the authentication supporting server 100 may perform or support another device to perform a process of determining whether the certificate identity information is identical to the identity registry information by referring to the certificate identity feature point information and the identity registry feature point information, to thereby authenticate the certificate identity information.

For example, similarly to the processes by the authentication supporting server 100 of determining whether the first real-time user biometric information corresponds to the certificate user biometric information, the CA server may determine whether the certificate identity information corresponds to the identity registry information.

And, in response to verifying the identity confirmation information, the authentication supporting server 100 may perform or support another device to perform a process of allowing the CA server to transmit authentication result information, including (1) the CA server DID, (2) first modified information created by modifying the real-time feature point information, and (3) the CA server signature value created by signing the first modified information with the CA server private key, to the authentication supporting server 100 at a step of S308.

As another example, the authentication supporting server 100 may determine whether the identity confirmation information corresponds to identity confirmation registry information.

For example, in response to verifying the user signature value, the authentication supporting server 100 may perform or support another device to perform a process of acquiring the identity confirmation information from the CA server, that is, the identity registry information corresponding to the certificate identity information, a process of extracting certificate identity feature point information from the certificate identity information, and a process of extracting identity registry feature point information from the identity registry information. And, the authentication supporting server 100 may perform or support another device to perform (i) a process of determining whether the certificate identity information is identical to the identity registry information by referring to the certificate identity feature point information and the identity registry feature point information, to thereby authenticate the certificate identity information, (ii) in response to a match between the certificate identity information and the identity registry information, a process of transmitting the real-time feature point information extracted from the first real-time user biometric information to the CA server, and (iii) a process of allowing the CA server to transmit authentication result information, including (1) the CA server DID, (2) the first modified information created by modifying the real-time feature point information, and (3) the CA server signature value created by signing the first modified information with the CA server private key, to the authentication supporting server 100.

And, in response to acquiring the authentication result information, the authentication supporting server 100 may perform or support another device to perform one of (i) a process of retrieving a CA server public key from the blockchain network 200 by referring to the CA server DID and (ii) (ii-1) a process of allowing the resolving server to retrieve information, corresponding to the CA server DID, including the CA server public key registered in the blockchain network 200 by referring to the CA server DID and thus to generate a CA server DID document and to transmit the CA server DID document to the authentication supporting server 100 and (ii-2) a process of retrieving the CA server public key from the CA server DID document, at a step of S309.

And, the authentication supporting server 100 may perform or support another device to perform (i) a process of verifying the CA server signature value by using the CA server public key at a step of S310, (ii) a process of registering the authentication result information in the blockchain network 200 in response to verifying the CA server signature value, at a step of S311, and (iii) a process of transmitting the user verifiable credential about the authentication result information registered in the blockchain network 200 to the user device, at a step of S312.

Figure 13:
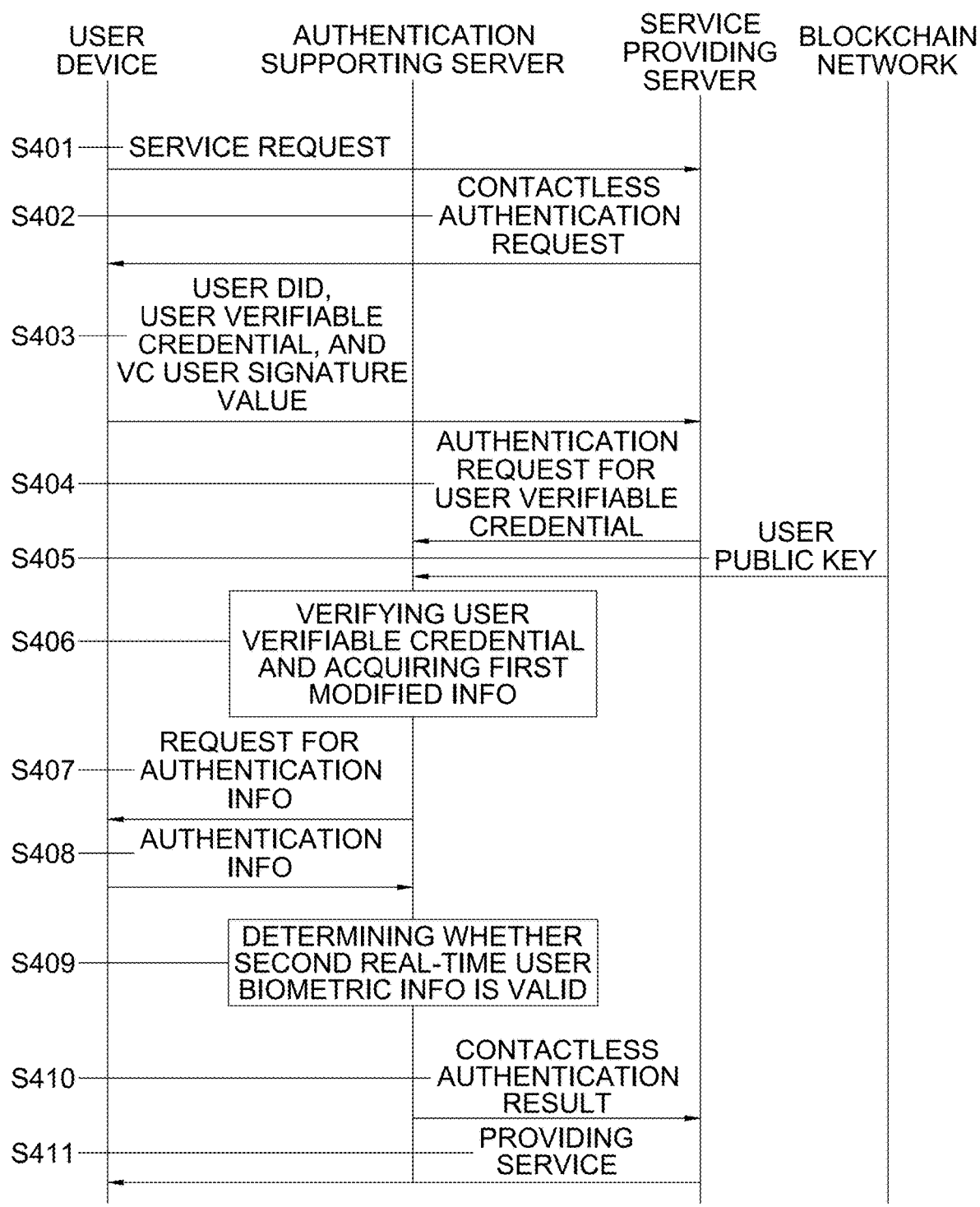
FIG. 13 is a drawing schematically illustrating processes of contactlessly authenticating a user based on the DIDs with the user verifiable credential in accordance with one example embodiment of the present disclosure.

Meanwhile, processes of authenticating the user contactlessly based on the decentralized identifiers with the user verifiable credential issued as such are described below by referring to FIG. 13.

First, in response to the service request transmitted from the user device to the service providing server at a step of S401, the service providing server may transmit the contactless authentication request for the first real-time user biometric information to the user device at a step of S402. Herein, the first real-time user biometric information may be used for providing a service of the service providing server to the user device.

And, in response to the contactless authentication request, the user device may transmit (1) the user DID, (2) the user verifiable credential about the first real-time user biometric information, and (3) the VC user signature value created by signing the user verifiable credential with the user private key to the service providing server at a step of S403, then the service providing server may transmit an authentication request for the user verifiable credential, acquired from the user device, to the authentication supporting server 100 at a step of S404. Herein, the authentication request for the user verifiable credential may include the user DID, the user verifiable credential, and the VC user signature value.

And, the authentication supporting server 100 may perform or support another device to perform (i) one of (i-1) a process of retrieving the user public key from the blockchain network 200 by referring to the user DID and (i-2) (i-2a) a process of allowing the resolving server to retrieve information, corresponding to the user DID, including the user public key registered in the blockchain network 200 by referring to the user DID and thus to generate a user DID document and to transmit the user DID document to the authentication supporting server 100 and (i-2b) a process of retrieving the user public key from the user DID document at a step of S405 and (ii) a process of verifying the VC user signature value by using the user public key.

And, in response to acquiring the user verifiable credential after verifying the VC user signature value, the authentication supporting server 100 may perform or support another device to perform (i) one of (i-1) a process of retrieving a CA server public key from the blockchain network 200 by referring to the CA server DID included in the user verifiable credential and (i-2) (i-2a) a process of allowing the resolving server to retrieve information, corresponding to the CA server DID, including the CA server public key registered in the blockchain network 200 by referring to the CA server DID and thus to generate a CA server DID document and to transmit the CA server DID document to the authentication supporting server 100 and (i-2b) a process of retrieving the CA server public key from the CA server DID document and (ii) a process of verifying the CA server signature value included in the user verifiable credential by using the CA server public key.

And, in response to verifying the CA server signature value and acquiring the first modified information at a step of S406, the authentication supporting server 100 may perform or support another device to perform a process of transmitting a request for authentication information to the user device at a step of S407 and a process of acquiring second real-time user biometric information as the authentication information from the user device at a step of S408.

For reference, the user device may represent what creates the second real-time user biometric information.

For example, if the user wants to pay for the service at an offline store, the user's face is scanned by a face recognition terminal installed in conjunction with a POS of the offline store, so that image information on the user's face is created as the second real-time user biometric information, and thus the second real-time user biometric information may be acquired from the face recognition terminal.

And, the authentication supporting server 100 may determine whether the second real-time user biometric information is valid by referring to (1) the second modified information created by modifying the new feature point information extracted from the second real-time user biometric information and (2) the first modified information at a step of S409.

As an example, if the first modified information is generated by applying the hash operation to the real-time feature point information extracted from the first real-time user biometric information, the authentication supporting server 100 may perform or support another device to perform (i) a process of applying the hash operation to the new feature point information extracted from the second real-time user biometric information, to thereby generate a new hash value and (ii) a process of determining whether the second real-time user biometric information is valid by referring to the new hash value and the first modified information.

Herein, the authentication supporting server 100 may determine whether the second real-time user biometric information is valid by referring to (1) the second modified information created by modifying the new feature point information extracted from the second real-time user biometric information and (2) the first modified information, and further, may determine whether the second real-time user biometric information is forged.

As an example, if the second real-time user biometric information is created by capturing the face of the user and if the second real-time user biometric information includes spatial information on the face of the user detected by the ToF module, the authentication supporting server 100 may perform or support another device to perform a process of determining whether the second real-time user biometric information is forged by referring to the spatial information representing distance information from the ToF module to each of the points on the face of the user.

And, if the second real-time user biometric information is determined as valid, the authentication supporting server 100 may transmit the contactless authentication result, corresponding to the contactless authentication request, to the service providing server at a step of S410, and according to the acquired contactless authentication result, the service providing server may provide the user device with the service at a step of S411.

The present disclosure has an effect of enabling non-face-to-face/contactless identity authentication using biometric technology that identifies each user with biometric information.

The present disclosure has another effect of providing self-regulating distributed digital identity information management technology in order to allow a user to manage/supervise the identity information by oneself and to select scope and material of the identity information to be opened to public by authentication and digital signatures through blockchain-based decentralized identifiers.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for contactlessly authenticating a user based on decentralized identifiers (DID) using a verifiable credential (VC), comprising steps of:
(a) responsive to a user DID being issued through a blockchain network, a user public key corresponding to the user DID being registered in the blockchain network, and acquiring, from a user device, a contactless authentication request that includes (1) the user DID, (2) identity confirmation information, (3) first real-time user biometric information, and (4) a user signature value created by signing the first real-time user biometric information with a user private key corresponding to the user public key, an authentication supporting server performing or supporting another device to perform:
(i) one of:
(i-1) a process of retrieving the user public key from the blockchain network by referring to the user DID contained in the contactless authentication request and
(i-2) (i-2a) a process of allowing a resolving server to (1) retrieve information corresponding to the user DID that includes the user public key registered in the blockchain network by referring to the user DID contained in the contactless authentication request, (2) generate a user DID document, and (3) transmit the user DID document to the authentication supporting server and (i-2b) a process of retrieving the user public key from the user DID document and
(ii) a process of verifying the user signature value using the user public key retrieved from the user DID document; and
(b) responsive to verifying the user signature value, the authentication supporting server performing or supporting another device to perform:
(i) a process of transmitting, to a certification authority (CA) server, real-time feature point information extracted from the first real-time user biometric information and the identity confirmation information, to allow the CA server to authenticate the identity confirmation information,
(ii) a process of allowing the CA server to transmit authentication result information to the authentication supporting server according to an authentication result of the identity confirmation information, wherein the authentication result information includes (1) a CA server DID, (2) first modified information created by modifying the real-time feature point information, and (3) a CA server signature value created by signing the first modified information with a CA server private key,
(iii) responsive to acquiring the authentication result information from the CA server, one of:
(iii-1) a process of retrieving a CA server public key from the blockchain network by referring to the CA server DID and
(iii-2) (iii-2a) a process of allowing the resolving server to (1) retrieve information corresponding to the CA server DID that includes the CA server public key registered in the blockchain network by referring to the CA server DID (2) generate a CA server DID document, (3) and transmit the CA server DID document to the authentication supporting server and (iii-2b) a process of retrieving the CA server public key from the CA server DID document,
(iv) a process of verifying the CA server signature value using the CA server public key retrieved from the CA server DID document,
(v) responsive to verifying the CA server signature value, a process of registering the authentication result information in the blockchain network, and
(vi) a process of transmitting a user verifiable credential about the authentication result information registered in the blockchain network to the user device.

2. The method of claim 1, wherein the identity confirmation information is certificate identity information of the user, and
wherein, at the step of (a), the authentication supporting server performs or supports another device to confirm whether the first real-time user biometric information is valid by performing:
(i) a process of determining whether the first real-time user biometric information is forged and
(ii) in response responsive to determining that the first real-time user biometric information is not forged, a process of determining whether the first real-time user biometric information corresponds to certificate user biometric information by referring to (1) certificate identity feature point information extracted from the certificate user biometric information included in the certificate identity information and (2) the real-time feature point information.

3. The method of claim 2, wherein the user device creates the first real-time user biometric information by capturing a face of the user and wherein the first real-time user biometric information includes spatial information on the face of the user detected by a ToF (Time of Flight) module of the user device and
wherein, at the step of (a), the authentication supporting server performs or supports another device to perform the process of determining whether the first real-time user biometric information is forged by referring to the spatial information representing distance information from the user device to each of points on the face of the user.

4. The method of claim 2, wherein the certificate user biometric information is facial image information on the user which is included in the certificate identity information and wherein the first real-time user biometric information is real-time image information created by capturing a face of the user responsive to a request for the first real-time user biometric information from the authentication supporting server.

5. The method of claim 4, wherein, at the step of (a), the authentication supporting server performs or supports another device to perform:
(i) a process of inputting (1) the facial image information included in the certificate identity information and (2) the real-time image information into a convolutional layer, and the convolutional layer applying at least one convolution operation to each of the facial image information and the real-time image information to output a facial feature map and a real-time feature map respectively corresponding to the facial image information and the real-time image information,
(ii) a process of inputting the facial feature map and the real-time feature map into an RPN and the RPN outputting proposal boxes corresponding to a facial area of the user on the facial feature map and the real-time feature map,
(iii) a process of inputting the proposal boxes into a pooling layer and the pooling layer applying at least one pooling operation to regions respectively corresponding to the proposal boxes on the facial feature map and the real-time feature map to (iii-1) generate pooled feature maps and (iii-2) output a facial feature vector and a real-time feature vector respectively corresponding to the pooled feature maps,
(iv) a process of inputting the facial feature vector and the real-time feature vector into an FC layer and the FC layer outputting a first score and a second score respectively corresponding to the facial feature vector and the real-time feature vector, and
(v) a process of confirming whether the first real-time user biometric information is valid by referring to the first score and the second score.

6. The method of claim 1, wherein the identity confirmation information is certificate identity information of the user, and
wherein, at the step of (b), the authentication supporting server performs or supports another device to perform a process of allowing the CA server to authenticate the certificate identity information by:
(i) extracting certificate identity feature point information from the certificate identity information,
(ii) extracting identity registry feature point information from identity registry information corresponding to the certificate identity information, and (iii) determining whether the certificate identity information corresponds to the identity registry information by referring to the certificate identity feature point information and the identity registry feature point information.

7. The method of claim 1, further comprising a step of:
(c) responsive to (c1) a service request being transmitted from the user device to a service providing server, (c2) a contactless authentication request for the first real-time user biometric information being transmitted from the service providing server to the user device, wherein the first real-time user biometric information is used for providing a service of the service providing server to the user device, (c3) the user DID and the user verifiable credential about the first real-time user biometric information being transmitted from the user device to the service providing server, and (c4) an authentication request for the user verifiable credential being acquired from the service providing server, wherein the authentication request includes (1) the user DID, (2) the user verifiable credential, and (3) a VC user signature value created by signing the user verifiable credential with the user private key, the authentication supporting server performing or supporting another device to perform:
(i) one of:
  (i-1) a process of retrieving the user public key from the blockchain network by referring to the user DID contained in the authentication request and
  (i-2) (i-2a) a process of allowing the resolving server to (1) retrieve the information corresponding to the user DID that includes the user public key registered in the blockchain network by referring to the user DID contained in the authentication request, (2) generate the user DID document, and (3) transmit the user DID document to the authentication supporting server and (i-2b) the process of retrieving the user public key from the user DID document,
(ii) a process of verifying the VC user signature value using the user public key,
(iii) responsive to acquiring the user verifiable credential as a result of verifying the VC user signature value, one of:
  (iii-1) a process of retrieving the CA server public key from the blockchain network by referring to the CA server DID included in the user verifiable credential and
  (iii-2) (iii-2a) a process of allowing the resolving server to (1) retrieve the information corresponding to the CA server DID that includes the CA server public key registered in the blockchain network by referring to the CA server DID, (2) generate the CA server DID document, and (3) transmit the CA server DID document to the authentication supporting server and (iii-2b) the process of retrieving the CA server public key from the CA server DID document,
(iv) a process of verifying the CA server signature value included in the user verifiable credential using the CA server public key retrieved from the CA server DID document,
(v) responsive to acquiring the first modified information as a result of verifying the CA server signature value, a process of transmitting a request for authentication information to the user device,
(vi) responsive to acquiring second real-time user biometric information as the authentication information from the user device, a process of determining whether the second real-time user biometric information is valid by referring to (1) second modified information created by modifying new feature point information extracted from the second real-time user biometric information and (2) the first modified information, and
(vii) responsive to confirming that the second real-time user biometric information is valid, a process of transmitting a contactless authentication result corresponding to the contactless authentication request to the service providing server.

8. The method of claim 7, wherein the first modified information is created by applying a hash operation to the real-time feature point information extracted from the first real-time user biometric information and
wherein, at the step of (c), the authentication supporting server performs or supports another device to perform a process of applying the hash operation to new feature point information extracted from the second real-time user biometric information, to thereby generate a new hash value and a process of determining whether the second real-time user biometric information is valid by referring to the new hash value and the first modified information.

9. The method of claim 7, wherein, at the step of (c), the second real-time user biometric information is image information created by capturing a face of the user and wherein the second real-time user biometric information includes spatial information on the face of the user detected by a ToF (Time of Flight) module, and
wherein the authentication supporting server performs or supports another device to perform a process of determining whether the second real-time user biometric information is forged by referring to the spatial information representing distance information from the ToF module to each of points on the face of the user, and responsive to determining that the second real-time user biometric information is not forged, a process of determining whether the second real-time user biometric information is valid by referring to the second modified information and the first modified information.

10. An authentication supporting server for authenticating a user contactlessly based on decentralized identifiers (DID) using a verifiable credential (VC), comprising:
at least one memory that stores instructions; and
at least one processor configured to execute the instructions to perform or support another device to perform:
(I) responsive to a user DID being issued through a blockchain network, a user public key corresponding to the user DID being registered in the blockchain network, and acquiring, from a user device, a contactless authentication request that includes (1) the user DID, (2) identity confirmation information, (3) first real-time user biometric information, and (4) a user signature value created by signing the first real-time user biometric information with a user private key corresponding to the user public key,
(i) one of:
  (i-1) a process of retrieving the user public key from the blockchain network by referring to the user DID contained in the contactless authentication request and (i-2) (i-2a) a process of allowing a resolving server t to (1) retrieve information corresponding to the user DID that includes the user public key registered in the blockchain network by referring to the user DID, (2) generate a user DID document, and (3) transmit the user DID document to the authentication supporting server and (i-2b) a process of retrieving the user public key from the user DID document and (ii) a process of verifying the user signature value by using the user public key; and (II) responsive to verifying the user signature value, (i) a process of transmitting, to a certification authority (CA) server, real-time feature point information extracted from the first real-time user biometric information and the identity confirmation information, to allow the CA server to authenticate the identity confirmation information, (ii) a process of allowing the CA server to transmit authentication result information to the authentication supporting server according to an authentication result of the identity confirmation information, wherein the authentication result information includes (1) a CA server DID, (2) first modified information created by modifying the real-time feature point information, and (3) a CA server signature value created by signing the first modified information with a CA server private key, (iii) responsive to acquiring the authentication result information from the CA server, one of:

(iii-1) a process of retrieving a CA server public key from the blockchain network by referring to the CA server DID and (iii-2) (iii-2a) a process of allowing the resolving server to (1) retrieve information corresponding to the CA server DID that includes the CA server public key registered in the blockchain network by referring to the CA server DID (2) generate a CA server DID document, (3) and transmit the CA server DID document to the authentication supporting server and (iii-2b) a process of retrieving the CA server public key from the CA server DID document, (iv) a process of verifying the CA server signature value using the CA server public key retrieved from the CA server DID document, (v) responsive to verifying the CA server signature value, a process of registering the authentication result information in the blockchain network, and (vi) a process of transmitting a user verifiable credential about the authentication result information registered in the blockchain network to the user device.

11. The authentication supporting server of claim 10, wherein the identity confirmation information is certificate identity information of the user, and wherein, at the process of (I), the processor performs or supports another device to confirm whether the first real-time user biometric information is valid by performing:

(i) a process of determining whether the first real-time user biometric information is forged and (ii) responsive to determining that the first real-time user biometric information is not forged, a process of determining whether the first real-time user biometric information corresponds to certificate user biometric information by referring to (1) certificate identity feature point information extracted from the certificate user biometric information included in the certificate identity information and (2) the real-time feature point information.

12. The authentication supporting server of claim 11, wherein the user device creates the first real-time user biometric information by capturing a face of the user and wherein the first real-time user biometric information includes spatial information on the face of the user detected by a ToF (Time of Flight) module of the user device and wherein, at the process of (I), the processor performs or supports another device to perform the process of determining whether the first real-time user biometric information is forged by referring to the spatial information representing distance information from the user device to each of points on the face of the user.

13. The authentication supporting server of claim 11, wherein the certificate user biometric information is facial image information on the user which is included in the certificate identity information and wherein the first real-time user biometric information is real-time image information created by capturing a face of the user responsive to a request for the first real-time user biometric information from the authentication supporting server.

14. The authentication supporting server of claim 13, wherein, at the process of (I), the processor performs or supports another device to perform:

(i) a process of inputting (1) the facial image information included in the certificate identity information and (2) the real-time image information into a convolutional layer, and the convolutional layer applying at least one convolution operation to each of the facial image information and the real-time image information to output a facial feature map and a real-time feature map respectively corresponding to the facial image information and the real-time image information, (ii) a process of inputting the facial feature map and the real-time feature map into an RPN and the RPN outputting proposal boxes corresponding to a facial area of the user on the facial feature map and the real-time feature map, (iii) a process of inputting the proposal boxes into a pooling layer and the pooling layer applying at least one pooling operation to regions respectively corresponding to the proposal boxes on the facial feature map and the real-time feature map to (iii-1) generate pooled feature maps and (iii-2) output a facial feature vector and a real-time feature vector respectively corresponding to the pooled feature maps, (iv) a process of inputting the facial feature vector and the real-time feature vector into an FC layer and the FC layer outputting a first score and a second score respectively corresponding to the facial feature vector and the real-time feature vector, and (v) a process of confirming whether the first real-time user biometric information is valid by referring to the first score and the second score.

15. The authentication supporting server of claim 10, wherein the identity confirmation information is certificate identity information of the user, and wherein, at the process of (II), the processor performs or supports another device to perform a process of allowing the CA server to authenticate the certificate identity information by:

(i) extracting certificate identity feature point information from the certificate identity information, (ii) extracting identity registry feature point information from identity registry information corresponding to the certificate identity information, and
(iii) determining whether the certificate identity information corresponds to the identity registry information by referring to the certificate identity feature point information and the identity registry feature point information.

16. The authentication supporting server of claim 10, wherein the processor further performs or supports another device to perform:
(III) responsive to (III-1) a service request being transmitted from the user device to a service providing server, (III-2) a contactless authentication request for the first real-time user biometric information being transmitted from the service providing server to the user device, wherein the first real-time user biometric information is used for providing a service of the service providing server to the user device, (III-3) the user DID and the user verifiable credential about the first real-time user biometric information being transmitted from the user device to the service providing server, and (III-4) an authentication request for the user verifiable credential being acquired from the service providing server, wherein the authentication request includes (1) the user DID, (2) the user verifiable credential, and (3) a VC user signature value created by signing the user verifiable credential with the user private key,
(i) one of:
(i-1) a process of retrieving the user public key from the blockchain network by referring to the user DID contained in the authentication request and
(i-2) (i-2a) a process of allowing the resolving server to (1) retrieve the information corresponding to the user DID that includes the user public key registered in the blockchain network by referring to the user DID contained in the authentication request, (2) generate the user DID document, and (3) transmit the user DID document to the authentication supporting server and (i-2b) the process of retrieving the user public key from the user DID document,
(ii) a process of verifying the VC user signature value using the user public key,
(iii) responsive to acquiring the user verifiable credential as a result of verifying the VC user signature value, one of:
(iii-1) a process of retrieving the CA server public key from the blockchain network by referring to the CA server DID included in the user verifiable credential and
(iii-2) (iii-2a) a process of allowing the resolving server to (1) retrieve the information corresponding to the CA server DID that includes the CA server public key registered in the blockchain network by referring to the CA server DID, (2) and thus to generate the CA server DID document, and (3) transmit the CA server DID document to the authentication supporting server and (iii-2b) the process of retrieving the CA server public key from the CA server DID document,
(iv) a process of verifying the CA server signature value included in the user verifiable credential using the CA server public key retrieved from the CA server DID document,
(v) responsive to acquiring the first modified information as a result of verifying the CA server signature value, a process of transmitting a request for authentication information to the user device,
(vi) responsive to acquiring second real-time user biometric information as the authentication information from the user device, a process of determining whether the second real-time user biometric information is valid by referring to (1) second modified information created by modifying new feature point information extracted from the second real-time user biometric information and (2) the first modified information, and
(vii) responsive to confirming that the second real-time user biometric information is valid, a process of transmitting a contactless authentication result corresponding to the contactless authentication request to the service providing server.

17. The authentication supporting server of claim 16, wherein the first modified information is created by applying a hash operation to the real-time feature point information extracted from the first real-time user biometric information and
wherein, at the process of (III), the processor performs or supports another device to perform a process of applying the hash operation to new feature point information extracted from the second real-time user biometric information, to thereby generate a new hash value and a process of determining whether the second real-time user biometric information is valid by referring to the new hash value and the first modified information.

18. The authentication supporting server of claim 16, wherein, at the process of (III), the second real-time user biometric information is image information created by capturing a face of the user and wherein the second real-time user biometric information includes spatial information on the face of the user detected by a ToF (Time of Flight) module, and
wherein the processor performs or supports another device to perform a process of determining whether the second real-time user biometric information is forged by referring to the spatial information representing distance information from the ToF module to each of points on the face of the user, and in responsive determining that the second real-time user biometric information is not forged, a process of determining whether the second real-time user biometric information is valid by referring to the second modified information and the first modified information.

* * * * *